(12) United States Patent
Douceur et al.

(10) Patent No.: US 6,401,126 B1
(45) Date of Patent: Jun. 4, 2002

(54) FILE SERVER SYSTEM AND METHOD FOR SCHEDULING DATA STREAMS ACCORDING TO A DISTRIBUTED SCHEDULING POLICY

(75) Inventors: John R. Douceur, Bellevue; William J. Bolosky, Issaquah, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/266,194

(22) Filed: Mar. 10, 1999

(51) Int. Cl.[7] .............................................. G06F 15/16
(52) U.S. Cl. ........................ 709/231; 709/202; 709/231; 709/232; 709/233; 709/226; 709/243; 370/395; 370/397; 370/230; 370/473; 710/6; 345/327; 725/115; 707/7; 711/118
(58) Field of Search .................................. 709/219, 231, 709/232, 202, 243, 226, 233; 370/395, 397, 473, 230; 710/6; 345/327; 725/115; 707/7; 711/118

(56) References Cited

U.S. PATENT DOCUMENTS

| 5,737,747 A | * | 4/1998 | Vihlitzky et al. ............ 711/118 |
| 5,845,279 A | * | 12/1998 | Garofalakis et al. ............ 707/7 |
| 5,867,657 A | * | 2/1999 | Bolosky et al. .............. 725/115 |
| 5,915,094 A | * | 6/1999 | Kouloheris et al. .......... 709/219 |
| 5,926,649 A | * | 7/1999 | Ma et al. ........................ 710/6 |
| 5,938,734 A | * | 8/1999 | Yao et al. .................... 709/232 |
| 5,956,321 A | * | 9/1999 | Yao et al. .................... 370/230 |
| 5,996,014 A | * | 11/1999 | Uchihori et al. ............ 709/226 |
| 6,085,221 A | * | 7/2000 | Graf ............................ 709/202 |
| 6,215,795 B1 | * | 4/2001 | Chauhan ..................... 3704/59 |
| 6,222,530 B1 | * | 4/2001 | Sequeira ..................... 345/327 |

* cited by examiner

Primary Examiner—David Wiley
Assistant Examiner—Oanh L. Duong
(74) Attorney, Agent, or Firm—Lee & Hayes, PLLC

(57) ABSTRACT

A distributed file server system has multiple data servers connected to stream data files continuously over a network to multiple clients. Data files are distributed across the data servers so that data blocks of the data files are stored at manage distributed portions of a schedule. Each data server sees a different portion of the schedule, but no one data server sees the whole schedule. The scheduler facilitates service of requested data streams from its corresponding data server according to a schedule portion that is available to the data server. The scheduler determines whether to insert a new data stream into the current slot it presently owns in its schedule portion, or to wait for a subsequent slot in the schedule based on a thrifty policy.

23 Claims, 14 Drawing Sheets

Fig. 2 (Prior Art)

Step 124 in Fig. 10

FILE SERVER SYSTEM AND METHOD FOR SCHEDULING DATA STREAMS ACCORDING TO A DISTRIBUTED SCHEDULING POLICY

TECHNICAL FIELD

This invention relates to continuous media file server systems that simultaneously serve multiple data streams to a large number of clients. More particularly, this invention relates to methods for scheduling service of data streams in a distributed schedule maintained throughout a file server system in a manner that minimizes clustering of scheduled data streams within the distributed schedule and maximizes gaps in the schedule between scheduled data streams.

BACKGROUND

A continuous media file server system is designed to serve continuous data streams, such as audio and video data files, to multiple clients. As an example, a file server system might simultaneously supply multiple digital data streams, each in the 1–10 megabits-per-second (Mb/s) range, to thousands of clients.

General Architecture

FIG. 1 shows a continuous media file server system 20 developed by Microsoft Corporation. The file server system is a distributed, scalable, and fault-tolerant server that can serve many continuous data streams simultaneously to a large number of clients. The file server system 20 has a central controller 22 connected to multiple data servers 24(1), 24(2), 24(3), . . . , 24(K) via a low bandwidth control network 26. The controller 22 receives requests from clients, such as requests for starting and stopping a particular data file. The controller 22 is responsible for initiating delivery of streaming content to the requesting clients, including such tasks as locating the data server that holds the first block of data in the requested data file. The controller and data servers can be implemented, for example, as general purpose computers.

Each data server 24 supports at least one storage device, such as a disk, as represented by storage disks 28(1), 28(2), . . . , 28(M) connected to data server 24(1). The disks 28 are attached to their respective data server 24 via one or more buses 30 (e.g., SCSI, Fiber Channel, EIDE, etc.). The number and configuration of storage disks are flexible, but within a given file server 20, all data servers 24 support the same number of storage disks 28. The storage disks can store large amounts of digital data, with example disk capacities of many Gigabytes. The storage capacity of the entire media file server 20 consists of the usable storage space on the storage disks. An operator can change the storage capacity of the file server by adding or removing one or more storage disks to or from each data server, or adding or removing one or more of the data servers to which the disks are connected.

The data servers 24 are connected to a high-speed network switch 32 via network interfaces 34 (e.g., network card). The network switch 32 takes the data segments read from the storage disks, orders them into a continuous stream, and distributes the streams over a network to the clients. The network switch 32 also provides high bandwidth, parallel communication between the data servers 24. Additionally, the controller 22 may be connected to the data servers 24 through the network switch 32, as opposed to a separate control network 26. As an example, the network switch 32 can be implemented using fiber optics and ATM (Asynchronous Transfer Mode) switches.

Each data server 24 contains a memory buffer, as represented by buffer 36 in data server 24(1). The buffer 36 temporarily stores data that is read from the disks 28(1)–28(M) and is to be output to the network switch 32.

The continuous media file server system 20 can be implemented in different contexts. For instance, the file server system 20 might function as a head end server in an interactive television (ITV) system, which serves audio and video files over a distribution network (e.g., cable, satellite, fiber optic, etc.) to subscriber homes. The file server system 20 might alternatively operate as a content provider that distributes data files over a network (e.g., Internet, LAN, etc.) to multiple client computers.

Data Striping

It is likely that some pieces of content will be more popular than others. For example, the top ten percent of movies ordered by popularity might garner 70% of the load, while the remaining 90% of the content attracts only 30% of the viewers. To avoid disproportionate use of storage disks 28 and data servers 24 (i.e., by overburdening the disks and data servers holding popular content while leaving other disk and data servers underutilized), the continuous media file server system 20 stripes all of the data files across all of the storage disks 28 and all of the data servers 24. When a client requests a data stream, all data servers 24 share in the distribution of that stream, each supplying a portion of the data stream in turn. In this way, the load is spread over all of the storage disks 28 and data servers 24 regardless of the data file's popularity.

Prior to this invention, the data streams were served at a constant data transmission bit rate. With this assumption, each data file could be broken into "blocks" of fixed temporal width. A block represented the amount of physical space allocated on a disk to hold one time unit of data, and could be expressed in terms of bytes. The temporal duration required to play the data in the block is known as a "block play time". For a data rate of 1 Mb/s, for example, the block size might be 1 Megabit and the block play time might be one second. In the conventional file server, a single block play time is established for all data files, resulting in a fixed-size data block.

Figure 2:
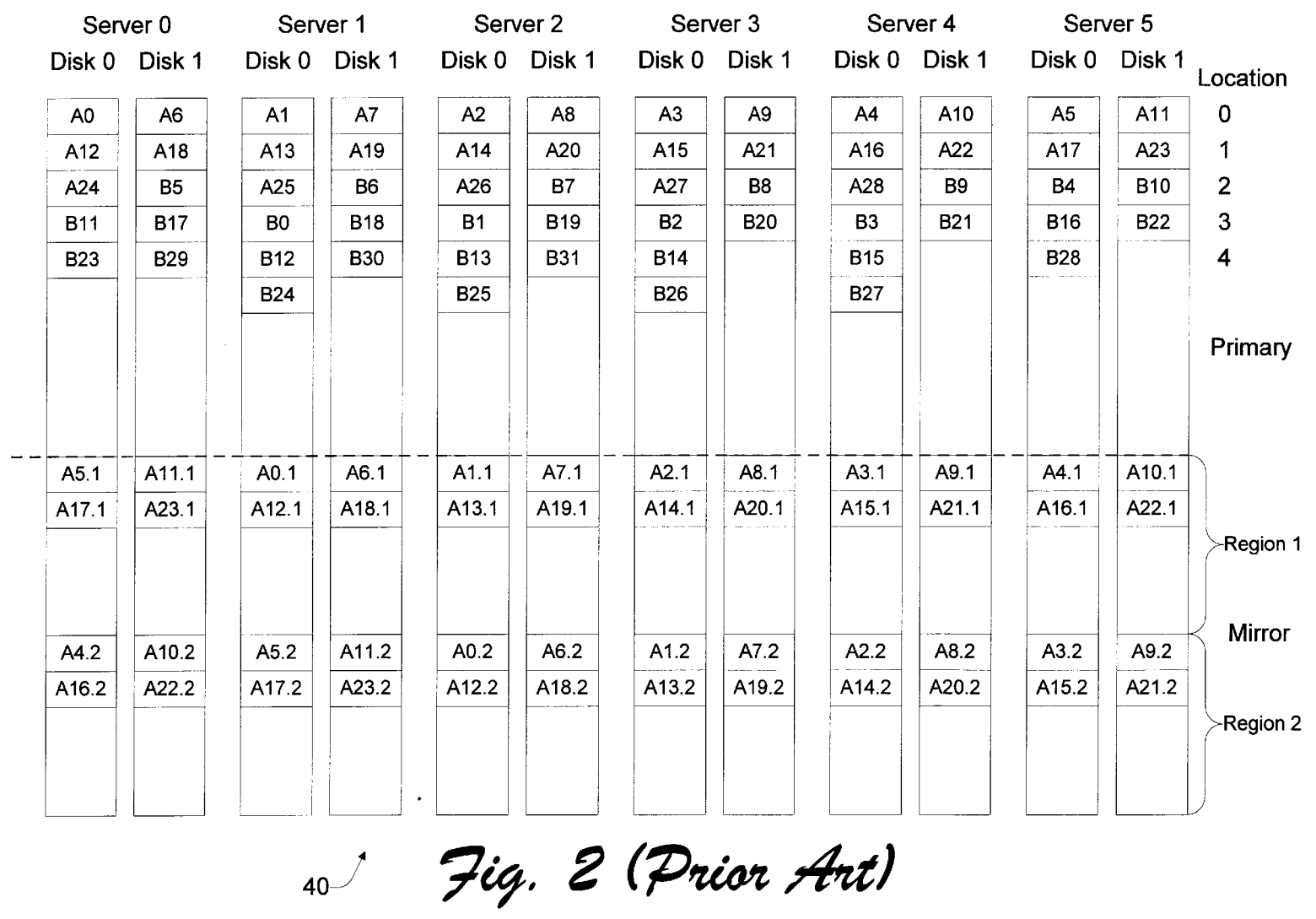

FIG. 2 shows an example file server disk array 40 consisting of six data servers 0–5, each supporting two storage disks. Each disk stores data blocks, as represented by the labeled rectangles such as "A0", "A6", etc. Data files are striped across every storage disk of every server. For each data file, a starting disk is chosen to hold the first data block. For instance, the first block of data file A, designated as block "A0", is stored on disk 0 of data server 0. A server index is incremented, and the next block in the file (i.e., block "A1") is placed on disk 0 of server 1. The striping continues across the first disks of each server.

When the last server 5 is reached, the striping pattern wraps and continues with the next disks of each server. More specifically, when the server index reaches the number of servers in the system, a disk index is incremented (modulo the number of disks per server) and the server index is reset to 0. In FIG. 2, after data block A5 is placed on disk 0 of server 5, the next block in the file (i.e., block "A6") is placed on disk 1 of server 0. Block A7 is then placed on disk 1 of server 1, and so on. This process continues until all the data blocks of the video file have been assigned to disks.

The process is then repeated for each subsequent data file. Typically, the striping pattern starts the various data files on different starting disks. In FIG. 2, two data files A and B are shown. Data file A begins on disk 0 of server 0, and data file B begins on disk 0 of server 1.

The striping pattern generally prescribes that the data blocks are sequentially ordered across ordered disks, but the sequential blocks need not reside at the same physical block address on adjacent disks. For instance, the striping pattern of files A and B result in the storage of sequential blocks B3 (disk 0, server 4) and B4 (disk 0, server 5) at different physical locations on the two disks (location 3 for block B3 and location 2 for block B4). Accordingly, sequential data blocks can reside at entirely different physical block locations within the contiguous disks. The block locations in the disk array are described by file metadata that is stored either in memory or on disk. It is noted that other patterns are possible.

To play a data file, the file server system 20 serves the data blocks sequentially from the storage disks, one block at a time. The data blocks are read from each disk, stored temporarily in buffer memory 36 at the server 24, and transmitted to the network switch 32 in order. When file A is requested by a client, for example, block A0 is read from disk 0 (server 0) and transmitted via server 0 to the network switch for the duration of a block play time. Next, block A1 is read from disk 0 (server 1) and transmitted via server 1 to the network switch for the duration of a block play time. The striping arrangement enables continuous and ordered cycling of the servers (i.e., server 0, server 1, . . . , server 5, server 0, etc.), and the disks attached to the server (i.e., disk 0, disk 1, disk 0, etc.). The network switch sequences among the servers to output a continuous data stream A to the requesting client.

Declustered Mirroring

Over time, components are expected to fail. To anticipate this possibility, the file server system 20 employs a data mirroring technique in which the primary data is duplicated and the redundant copy is also maintained on the disks. The data mirroring is illustrated conceptually in FIG. 2, wherein the disks are divided in half with the upper half of the disks storing the primary data and the lower half of the disks storing redundant data.

The two copies of each file are stored on separate servers, in case an entire server or disk fails. One way of accomplishing this is to store all of the data from server 0's disks redundantly on server 1's disks, all of the data from server 1's disks redundantly on server 2's disks, and so on. However, if server 0 were to fail in this arrangement, the workload of server 1 would double because it would have to support its original distribution of video data plus the distribution of video data for server 0. If each server is configured to support twice its workload, the servers are using only half of their resources during normal operation when there are no failures in the system.

To avoid this inefficiency, each block of the redundant data is split into multiple pieces, and the pieces are distributed among the disks of multiple servers. This process is known as "declustering", and the number of pieces into which each block is split is known as the "decluster factor".

FIG. 2 shows a disk configuration with a decluster factor of two, meaning there are two redundant pieces for every primary data block. The data for server 0's disks are stored redundantly on the disks of servers 1 and 2; the data for server 1's disk are stored redundantly on disks of servers 2 and 3; and so on. With a decluster factor of two, the mirror half of the storage disks can be further conceptualized as having two regions: a first region to store the first redundant piece (i.e., X.1) and a second region to store the second redundant piece (i.e., X.2). As an example, primary data block A0 (disk 0, server 0) is split into two redundant pieces "A0.1" and "A0.2" in which the first redundant piece A0.1 is stored in region 1 of disk 0 of server 1 and the second redundant piece A0.2 is stored in region 2 of disk 0 of server 2.

If the server carrying the primary data fails, the mirrored data on the other servers is used. Suppose, for example, that server 0 fails. When it comes time to serve data block A6 (originally on disk 1, server 0), server 1 reads and outputs the first redundant piece A0.1 and server 2 reads and outputs the second redundant piece A0.2.

The declustered mirroring technique results in a more even distribution of increased workload among the operable servers in the event that one server (or disk) fails. This is because when a component fails, several other servers share the work of making up for the failed component. In our example of a small decluster factor of two, the increased burden to a data server is only fifty percent (i.e., its own workload and half of the failed server's workload), rather than a doubling of workload that would be needed in the absence of declustering. As the decluster factor increases, the additional burden shared by the non-failed servers is reduced.

Centralized Disk Scheduling

Due to the striping arrangement and disk configuration shown in FIG. 2, all servers share in the distribution of a data stream, each supplying the ordered blocks of data in turn. This shared operation requires a mechanism to determine when each server should provide data for each stream. Such a mechanism is provided by a time-ordered schedule that specifies, for each server 24, when to read each block of data from disk and when to transmit this data over the network 32.

In one prior implementation, the file server system 20 relies on a centralized scheduler that is maintained by the central controller 22 (FIG. 1). With a centralized scheduler, the controller 22 periodically sends messages to the servers 24, telling them what operations to perform in the near future. The schedule is defined to guarantee that, once streams are admitted, they can be serviced in a deterministic fashion to ensure availability of system resources when needed to distribute the streams. Thus, the schedule serves both as a description of when data is to be read and transmitted and also as an indication of resource allocation. There are three main resources that are allotted to the data streams: disk bandwidth, network bandwidth, and buffer memory.

The schedule for a single-rate file server is one of disk operations, and hence is referred to as a "disk schedule". The temporal length of the disk schedule is the block play time multiplied by the number of disks in the system. In the FIG. 2 example with 12 disks and a block play time of one second, the disk schedule has a temporal length of 12 seconds.

FIG. 3 shows a disk schedule 42 for a six-server, two-disk file system. The disk schedule 42 is divided into time slots 44, the width of which is determined by the amount of time necessary to service a single data block, a duration known as the "block service time". This time is equal to the block play time divided by the number of streams that can be supported per disk. This number is not necessarily integral; a fractional number of streams per disk may be supported. If the stream distribution capacity of a particular instance of the file server 20 is limited by disk performance, the block service time is equal to the time to read one block of data from the disk, including both seek time and data transfer time. Alternatively, if the stream distribution capacity of a particular instance of the file server 20 is limited by some other factor, such as network performance or I/O bus bandwidth, the block service time is calculated as the block play time divided by the number of supported streams per server multiplied by the number of disks per server.

In FIG. 3, the block service time of the schedule 42 is one-half of the block play time (i.e., ½ second), indicating that each disk can support two data streams. Accordingly, each slot 44 is one-half second in duration, yielding twenty-four slots 44 in the twelve second disk schedule 42. The slots 44 are individually labeled as S0–S23 for identification purposes. In this example, the block service time is atypically high for ease of illustration. More typically, a disk can support between 5 and 20 data streams, depending upon the data transmission rate, resulting in a much lower block service time.

Each server's workload is kept low enough that there is sufficient remaining capacity for reading and transmitting declustered redundant blocks, in the event that a neighboring server fails. This is accomplished by increasing the block service time to allow for this additional workload. The exact factor by which this is increased depends upon the limiting resource in the system, but it is typically somewhat greater than 1/(decluster factor).

Requests for data files are assigned a slot in the schedule 42. Here, nine data streams 0–8 are presently scheduled. In theory, the disk schedule 42 determines when the disk read operations on each server are performed for each stream 0–8. In practice, disk reads are generally performed earlier than the scheduled times, although the lead time is bounded by a system configuration parameter. Network operations are not explicitly scheduled; rather, the beginning of each data transmission immediately follows the scheduled completion of the disk read.

As shown in FIG. 3, there is a pointer into the schedule 42 for each disk of each server, spaced at intervals of one block play time. The pointers are labeled in FIG. 3 in a format "Server #, Disk #" to reference the appropriate the server and disk. The pointers move to the right in this illustration, while the schedule 42 remains stationary. Every twelve seconds, each pointer winds up back where it started. At the instant shown in FIG. 3, disk 1 of server 3 is scheduled to be in progress of reading a data block for stream 5; disk 1 of server 1 is scheduled to read a block for stream 1; disk 0 of server 3 is scheduled to read a block for stream 3; and disk 0 of server 1 is scheduled to read a block for stream 4.

Even though data blocks are only being read for a fraction of the streams at any given time, data is being transmitted for all streams at all times. At the instant shown in FIG. 3, data is being transmitted for each stream from the server as indicated in the following table:

| Stream | Server | Disk |
|--------|--------|------|
| 0 | 4 | 0 |
| 1 | 0 | 1 |
| 2 | 5 | 1 |
| 3 | 2 | 0 |
| 4 | 0 | 0 |
| 5 | 2 | 1 |
| 6 | 3 | 0 |
| 7 | 0 | 1 |
| 8 | 2 | 0 |

In the above table, server 0 is currently transmitting stream 1, while server 5 is concurrently transmitting stream 2, and so on. Notice also that while preceding servers are transmitting the data block, the next servers in order are reading the next data block from the disks. In this example, while server 0 is transmitting a block for stream 1, the next server 1 is currently reading the next block for stream 1. Server 1 will then transmit this next block following the transmission of the current block by server 0.

As time progresses, the controller 22 advances the pointers through the schedule 42, leading the actual value of time by some amount that is determined by the system configuration parameter. This lead allows sufficient time for processing and communication, as well as for reading the data from the disk. When the pointer for a server reaches a slot that contains an entry for a stream, the controller 22 determines which block should be read for that stream, and it sends a message to the appropriate server. The message contains the information for the server to process the read and transmission, including the block to be read, the time to begin the transmission, and the destination of the stream.

U.S. Pat. No. 5,473,362, entitled "Video on Demand System Comprising Stripped (sic) Data Across Plural Storable Devices With Time Multiplex Scheduling," which was filed on Nov. 30, 1993 and issued on Dec. 5, 1995, in the names of Fitzgerald, Barrera, Bolosky, Draves, Jones, Levi, Myhrvold, Rashid and Gibson, describes the striping and scheduling aspects of the continuous media file server 20 in more detail. This patent is assigned to Microsoft Corporation and incorporated by reference. In this document, the file server described in U.S. Pat. No. 5,473,362 is generally referred to as a "centralized file server system".

Scheduling New Streams: Greedy Policy

When a viewer requests that a new stream be started, the controller 22 first determines the server and disk on which the starting block resides. The controller 22 then searches for a free slot in the disk schedule 42, beginning shortly after the pointer for the indicated server and disk, and progressing sequentially until it finds a free slot.

For example, suppose that a new stream request to play stream 9 arrives at the instant shown in FIG. 3, and that the controller 22 determines that the starting block for new stream 9 resides on disk 1 of server 2 (i.e., Server 2, Disk 1). Furthermore, suppose that the minimum insertion lead time is equal to one block service time, i.e., one slot width.

The controller begins searching for a free slot, starting at one slot width to the right of the pointer for disk 1 of server 2. This point is mid-way through a slot S4, so there is not sufficient width remaining in the slot for the stream to be inserted. The controller proceeds to the next slot S5 to the right, which is occupied by stream 1, and thus not available for the new stream 9. Similarly, the next slot S6 is occupied by stream 7. The next slot S7 is unoccupied, however, so the new stream 9 is inserted to this slot S7.

To reach slot S7, the new stream insertion request slips by over two slots. If the block service time is 100 ms, the schedule slip induces a startup delay of over 200 ms, since it will take this additional amount of time before disk 1 of server 2 reaches slot S7.

The interval between the time a new stream request is received and the time that the content is actually served is known as "latency". It is desirable to minimize stream startup latency experienced by a user. The insertion method just described employs a "greedy policy". For each new stream, the selected schedule slot is the slot that minimizes startup latency experienced by the requesting viewer. That is, the greedy policy grabs the first available slot and inserts the new stream request into that slot.

The greedy policy has the desirable property of minimizing the mean startup latency over all stream insertions and all schedule loads. Early users in the schedule experience very short latencies. Unfortunately, late comers to the schedule (i.e., the last few requests in an almost fully loaded schedule) experience excessive latencies while the controller is seeking to find an open slot.

Large startup latencies at high loads are caused by the presence in the schedule of large clusters of contiguously allocated slots. For instance, suppose in FIG. 3 that slots S0–S18 are filled and a new request is received for a server and disk whose pointer is currently referencing slot S0. The 18-slot slippage causes excessive latency in comparison to the above example of a 2-slot slippage.

Some amount of schedule clustering is virtually unavoidable; however, the greedy algorithm has a strong tendency to grow clusters for two reasons. First, the likelihood of a schedule insertion in the slot immediately following a cluster is proportional to the length of that cluster, so long clusters tend to grow longer. Second, two clusters near each other will be joined into a single cluster when the intervening slots are filled. Because of this second phenomenon, startup latency grows much faster than linearly as the schedule load approaches unity.

Mean latency may not be an appropriate metric for evaluating user satisfaction. Mean behavior measures the aggregate effect of many schedule insertions, but each viewer experiences a startup latency corresponding to a single insertion. A user who experiences the annoyance of an extraordinarily long delay is unlikely to be appeased by the knowledge that a large number of other users were serviced in a far more timely fashion. In addition, user satisfaction does not vary linearly with response time. For instance, the benefit from reducing one viewer's startup latency from ten seconds to one second exceeds the total benefit from reducing ten viewers' startup latencies from two seconds to one second.

Scheduling New Streams: Thrifty Policy

Thrifty scheduling attempts to improve perceived system responsiveness by reducing startup latencies that are relatively high at the expense of increasing startup latencies that are relatively low, even if doing so increases the mean startup latency. The thrifty policy accepts any startup latency not exceeding a given value. The thrifty policy is greedy in reducing startup latency in excess of this acceptable value, but it may sacrifice latency within the acceptable range for the sake of reducing the latency of later schedule insertions.

The thrifty policy is fairly straightforward. When a new stream is requested, it examines all available slots within the acceptable range and chooses the slot that minimizes the clustering in the schedule, as determined by a metric that quantifies the degree of clustering. In the event of a tie, or if no slots are available within the acceptable range, the thrifty policy selects the slot that results in the lowest startup latency.

The thrifty policy for the centralized file server system is described in U.S. Pat. No. 5,642,152, entitled "Method and System for Scheduling the Transfer of Data Sequences Utilizing an Anti-Clustering Scheduling Algorithm," which was filed on Dec. 6, 1994 and issued on Jun. 24, 1997, in the names of Douceur and Bolosky. This patent is assigned to Microsoft Corporation and incorporated by reference.

The thrifty policy described in the '152 patent makes several demands on the system. For instance, calculation of the clustering metric requires access to the entire schedule. This is not a problem for the centralized file server system because the complete schedule is kept at the central controller 22. Another constraint in the centralized case is that the new stream requests are not queued. When a new stream is requested, it is assigned to the appropriate slot upon request, rather than being queued for later insertion. While these constraints are acceptable in the centralized case, they cannot be supported in the distributed case.

Distributed Disk Scheduling

In the centralized file server system described above, the controller 22 maintains the entire schedule for all data servers 24. In a second design, there is no one complete schedule. Instead, the schedule is distributed among all of the data servers 24 in the system, such that each server holds a portion of the schedule but, in general, no server holds the entire schedule.

The disk schedule in the distributed system is conceptually identical to the disk schedule in the centralized system. However, the disk schedule is implemented in a very different fashion because it exists only in pieces that are distributed among the servers. Each server holds a portion of the schedule for each of its disks, wherein the schedule portions are temporally near to the schedule pointers for the server's associated disks. The length of each schedule portion dynamically varies according to several system configuration parameters, but typically is about three to four block play times long. In addition, each item of schedule information is stored on more than one server for fault tolerance purposes.

Periodically, each server sends a message to the next server in sequence, passing on some of its portions of the schedule to the next server that will need that information. This schedule propagation takes the form of messages called "viewer state records". Each viewer state record contains sufficient information for the receiving server to understand what actions the receiving server must perform for the schedule entry being passed. This information includes the destination of the stream, a file identifier, the viewer's position in the file, the temporal location in the schedule, and some bookkeeping information.

U.S. Pat. No. 5,867,657, entitled "Distributed Scheduling in a Multiple Data Server System," which was filed Jun. 6, 1996, and issued Feb. 2, 1999 in the names of Bolosky and Fitzgerald, describes a method for distributing the schedule management among the data servers 24. This application is assigned to Microsoft Corporation and incorporated by reference. In this document, the file server described in this U.S. Patent is generally referred to as a "distributed file server system".

The distributed file server system employs the greedy policy to handle new stream requests. When a request to insert a new data stream is received at the controller, it notifies the data server 24 that holds the starting block of the new stream request. The data server adds the request to a queue of pending service requests.

The data server then evaluates its own portion of the schedule to decide whether an insertion is possible. Associated with each schedule slot in the distributed schedule is a period of time, known as an "ownership period", that leads the slot by some amount. The server whose disk points to the ownership period in the schedule is said to own the associated slot. The ownership period leads the associated slot by somewhat more than a block service time. This lead ensures that the data server that schedules a new stream for a slot has sufficient time for processing and communication, as well as for reading the data from the disk.

When a server obtains ownership of a slot, the server examines the slot to determine whether the slot is available to receive the new data stream. If it is, the server removes the request from the queue and assigns the stream to the slot. This assignment is performed by generating a viewer state record according to the information in the stream request. This viewer state record is treated in the same manner as a viewer state record received from a neighboring server.

While the greedy policy is effective for the distributed file server system, it possesses the same drawbacks as described above in the context of the centralized file server system. Namely, the greedy policy minimizes the mean startup latency over all stream insertions and all schedule loads at the undesirable expense of having later users experience excessive latencies.

It would be beneficial to adopt a thrifty policy for use on the distributed file server system. However, the distributed schedule complicates the thrifty policy in several ways. First, since only a portion of the schedule is visible to each data server at any time, the scheduling technique must make decisions based upon purely local data. Second, since a data server owns only one slot at a time, the scheduling technique cannot decide exactly where in the schedule to insert a new stream; it can decide only whether or not to insert the new stream into the currently owned slot. Furthermore, since a data server may not schedule a stream as soon as it receives the start play request, multiple requests can accumulate in its pending service queue, and the scheduling algorithm will need to account for these queued stream requests in addition to the streams already in the schedule.

Accordingly, there is a need to develop a thrifty scheduling policy that can be implemented in a distributed file server system.

SUMMARY

This invention concerns a continuous media file server system that is capable of simultaneously distributing continuous data streams according to a thrifty scheduling policy.

In the illustrated implementation, the file server system is a distributed system with multiple data servers connected to stream data files continuously over a network to multiple clients. Each data server supports at least one storage disk. Data files are distributed across the data servers so that data blocks of the data files are stored on each of the storage disks.

The file server system has a distributed scheduling system that distributes portions of a schedule to individual data servers. Each data server sees a different portion of the schedule, but no one data server sees the whole schedule. The distributed scheduling system has a scheduler located at each of the data servers. The scheduler facilitates service of requested data streams from its corresponding data server according to a schedule portion that is available to the data server.

The schedule is segmented into slots, which are assigned to requested data streams to coordinate simultaneous distribution of the data streams. Occupied slots indicate that a data stream is assigned to that temporal location in the schedule. Vacant slots indicate that no corresponding data stream has been assigned to that temporal location in the schedule.

Each scheduler is configured to make assumptions as to whether the slots preceding and following the schedule portion viewable by the data server are vacant or occupied. Based in part on these assumptions, the scheduler determines an insertion spread and an insertion width. An insertion spread represents a distance between consecutively occupied slots in the schedule. In contrast, an insertion width represents a number of contiguously occupied slots (i.e., the number of clustered occupied slots).

From the insertion spread and insertion width, the scheduler determines whether to insert a new data stream into the current slot it presently owns in its schedule portion, or to wait for a subsequent slot in the schedule. The determination adheres to a policy that attempts to maximize insertion spread (i.e., maximize spacing of occupied slots as far apart as possible within the schedule), while minimizing insertion width (i.e., minimizing clustering of occupied slots). The scheduler also factors in a maximum acceptable slippage that dictates the highest number of slots that the scheduler is willing to slip in the schedule before starting the new data stream, without causing undue delay to the user who requested the slipped data stream.

The end result is a more even distribution of the occupied slots within the schedule. This distribution reduces startup latency for late schedule insertion at the expense of slightly prolonging the startup latency of early schedule insertions.

BRIEF DESCRIPTION OF THE DRAWINGS

FIG. 2 is a diagrammatic illustration of a 12-disk storage disk array of the continuous media file server system. FIG. 2 shows a striping layout in which data is striped across all of the storage disks in the array.

DETAILED DESCRIPTION

Figure 1:
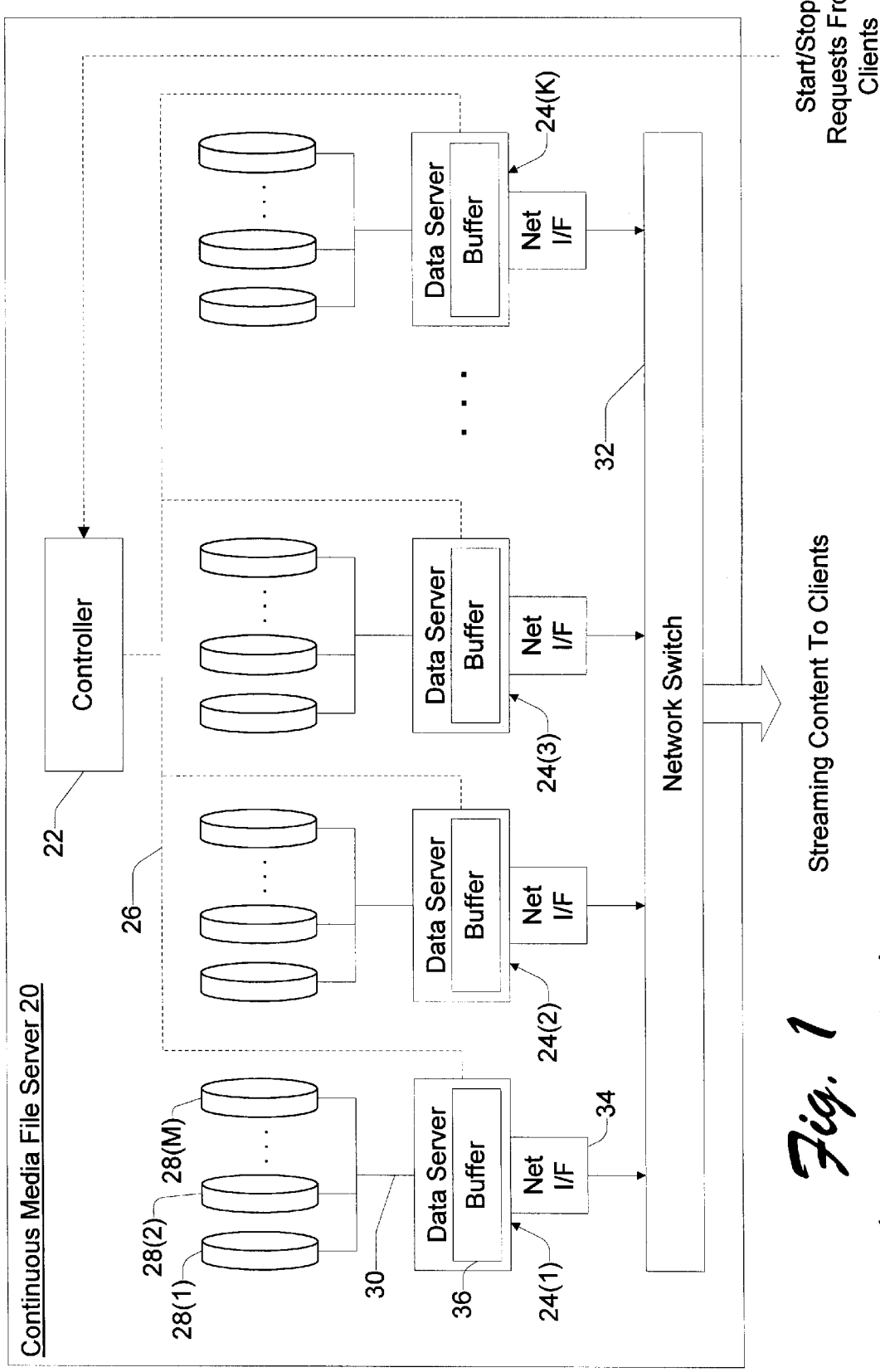
FIG. 1 is a diagrammatic illustration of a conventional, single-rate continuous media file server system.
Figure 4:
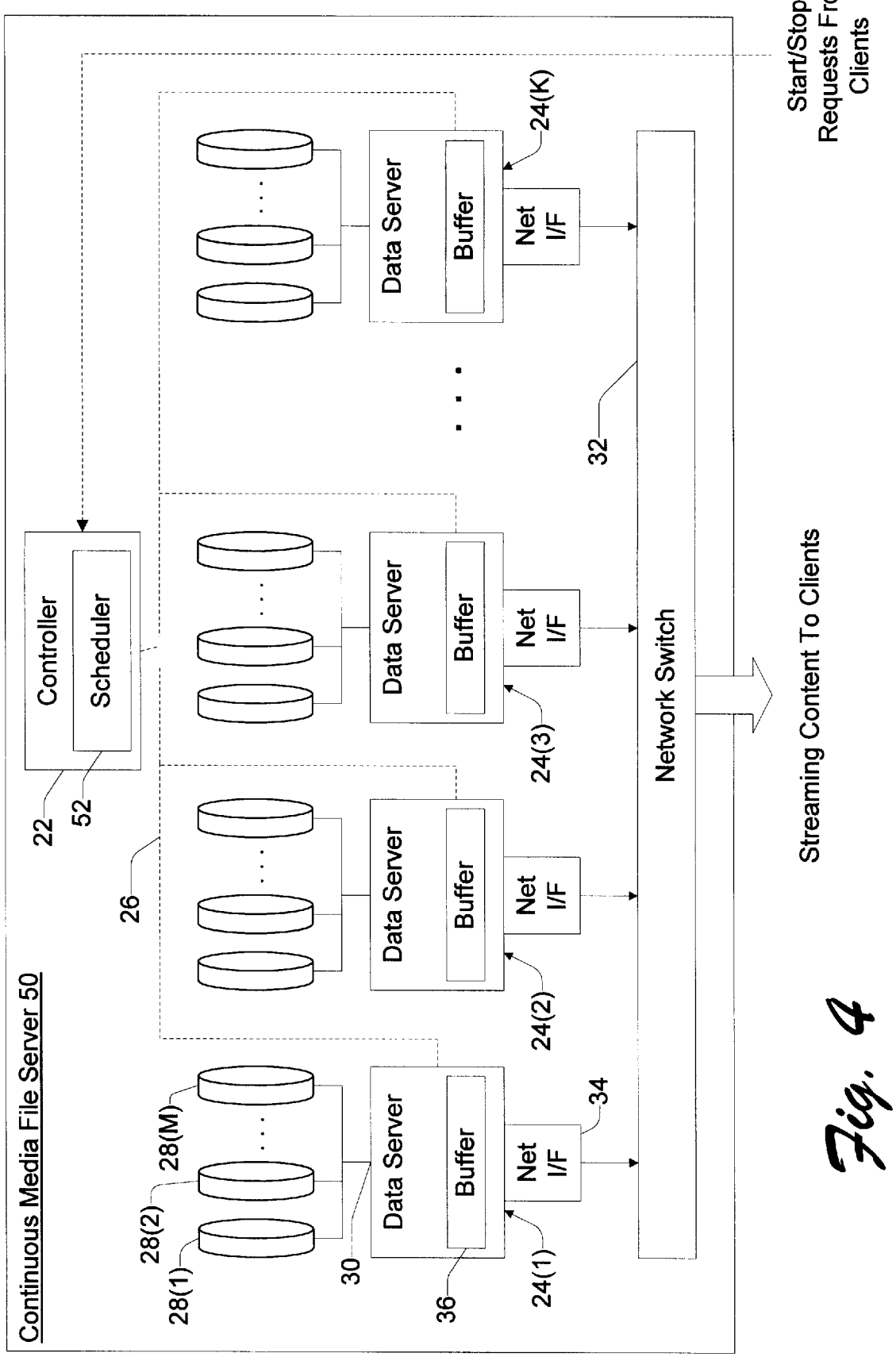
FIG. 4 is a diagrammatic illustration of a continuous media file server system according to one implementation having a centralized scheduling mechanism.
Figure 5:
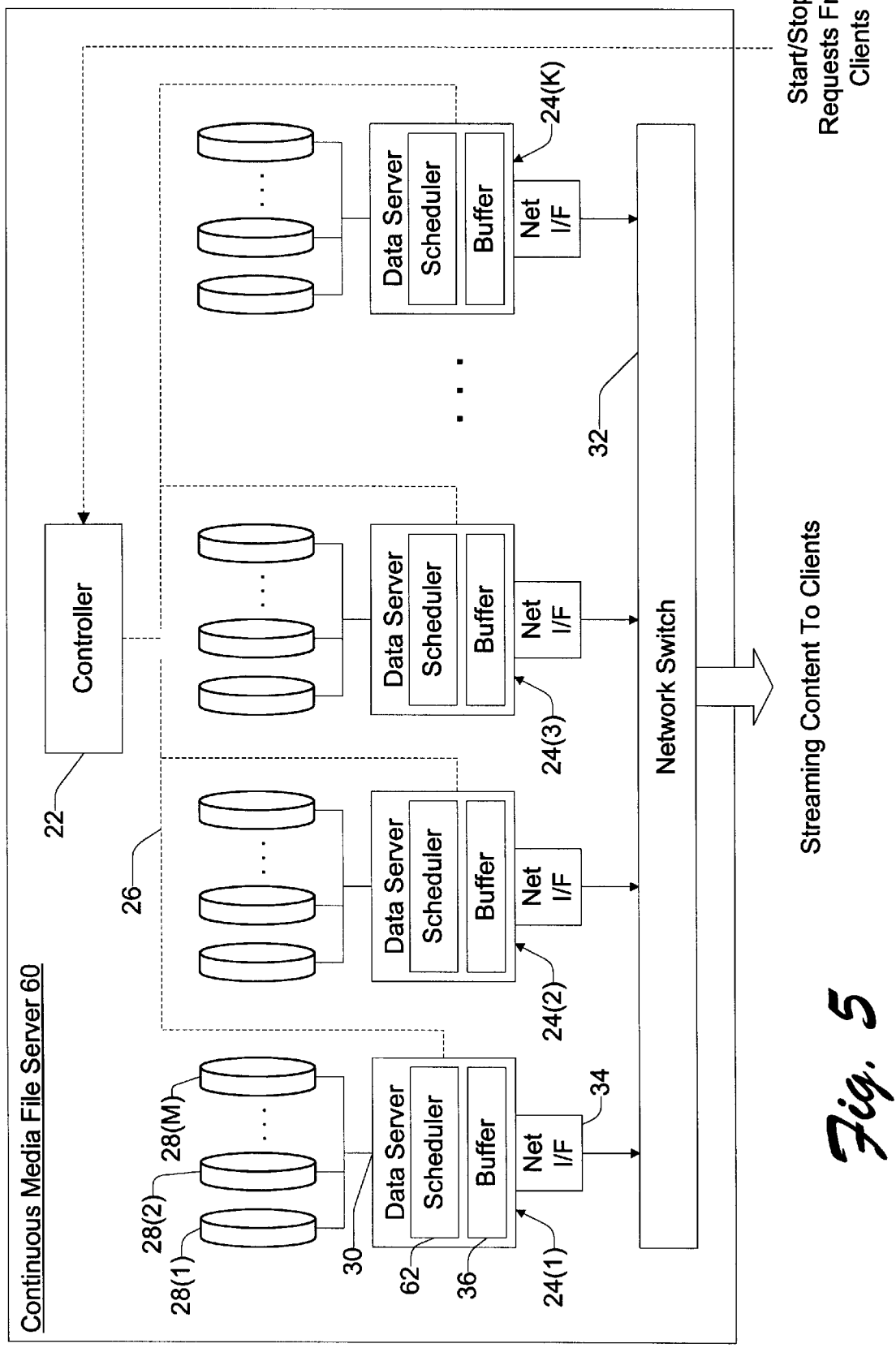
FIG. 5 is a diagrammatic illustration of a continuous media file server system according to another implementation having a distributed scheduling mechanism.

FIGS. 4 and 5 show two implementations of a continuous media file server system that is configured to deliver data streams at multiple data rates. The file server systems are similar to the server 20 described in the Background with reference to FIG. 1, with the same numbers referencing like components and features.

There are two basic architectures for the file server system: centralized and distributed. FIG. 4 shows a centralized server system 50, wherein a scheduler 52 is implemented at the controller 22. FIG. 5 shows a distributed server system 60 in which the scheduling tasks are distributed among the data servers 24. In the distributed architecture, schedulers 62 reside at each server 24.

This invention is particularly directed to the distributed server system 60. However, some aspects of the invention may be implemented in the centralized server system. These aspects will be identified in the course of discussion.

The controller 22 and data servers 24 can be implemented using general-purpose computers. Such computers include conventional components such as one or more data processors, volatile and non-volatile primary electronic memory, secondary memory such as hard disks and floppy disks or other removable media, display devices, input devices, and other components that are well known. Each computer runs an operating system, such as the Windows NT operating system from Microsoft Corporation. The schedulers 52 and 62 are preferably software application programs that are stored and executed on the computers.

The data processors are programmed by means of instructions stored at different locations in the various computer-readable storage media of the computer. Programs are typically installed or loaded into the secondary memory of a computer. At execution, they are loaded at least partially into the computer's primary electronic memory. Aspects of the invention described herein include these and other various types of computer-readable storage media when such media contain instructions or programs for implementing the steps described below in conjunction with a microprocessor or other data processor. Aspects of the invention also include the computers themselves when programmed according to the methods and techniques described below.

Thrifty Distributed Scheduling Policy

In the distributed server system 60, the schedule for serving multiple data streams is distributed among all of the data servers 24 in the system. Each server holds a portion of the schedule but, in general, no server holds the entire schedule. There is no one complete schedule.

The thrifty policy attempts to distribute the stream requests evenly over the available slots. This is contrasted with the greedy policy described in the Background, wherein each data server simply examines the slot it presently owns to determine whether the slot is available to receive the new data stream. If it is, the server inserts the slot into the schedule.

To distribute the new stream requests more evenly over the slots of the schedule, the data server would like to know more of the schedule than it can presently view. In the centralized file server system, the thrifty policy has the benefit of knowing the entire schedule since it is kept centrally at the controller 22. As a result, the controller can examine the entire schedule before making an insertion.

Unfortunately, in the distributed file server system, each data server 24 sees only a portion of the schedule. Accordingly, each data server has to make assumptions about the parts of the schedule that it cannot see. Generally, each data server performs the following two phases:

Phase 1: Create a hypothetical schedule that assumes more of the schedule than is actually before the data server.

Phase 2: Determine whether the request for a new data stream should be inserted into the slot currently owned by the data server, or whether it is better to wait for a subsequent slot in the schedule.

Phase 1: Create Hypothetical Schedule

In the first phase, each data server 24 in the distributed file server system 60 makes a set of assumptions to produce a hypothetical schedule that is more expanded than the actual schedule. The assumptions are intentionally conservative, so that a stream insertion will not be delayed due to an overly optimistic expectation of future scheduling opportunities.

Figure 6:
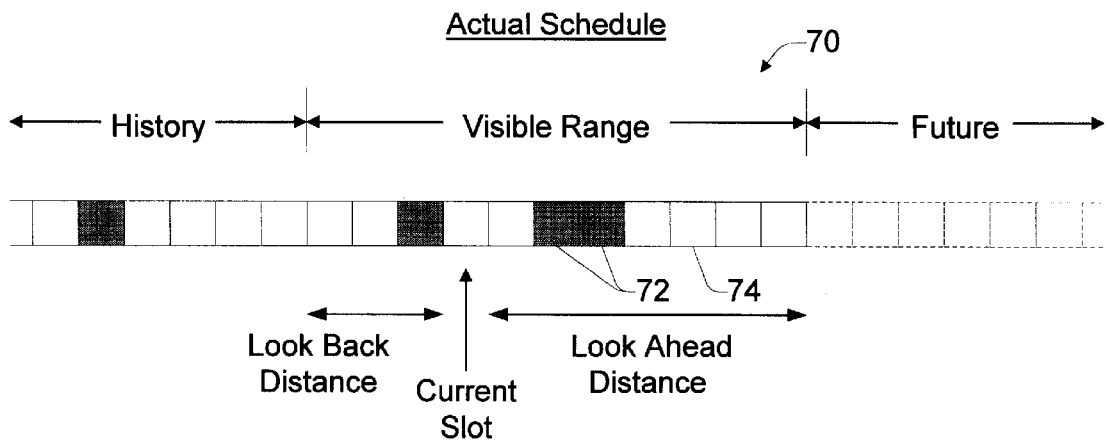
FIG. 6 shows a portion of a schedule for serving data streams as it might appear to a single data server in the distributed file server system of FIG. 5.

FIG. 6 shows a portion of a schedule 70 as it might appear to a single data server. The slots labeled "visible range" are those for which the data server currently holds viewer state records. The occupancy of these slots is known, except for the fact that slots more than a block play time ahead in the schedule may be assigned by another server before they reach the current server's ownership period. For illustration purposes, occupied slots 72 are shown as filled blocks, whereas unoccupied slots 74 are shown as empty blocks.

The slots labeled "future" as those for which the data server has yet to receive viewer state records. The data server has no knowledge of these future slots beyond its visible range; hence, they are shown by dashed lines.

The slots labeled "history" represent the slots for which the data server used to hold the viewer state records, but recently transferred onto the next data server. The boundary demarcating the historical and visible slots is the point at which the next server takes ownership of the slot. Even though the data server has some knowledge of the slots in its history, the knowledge is very uncertain. The next server in sequence may assign streams to these slots without notifying the present data server.

Figure 7:
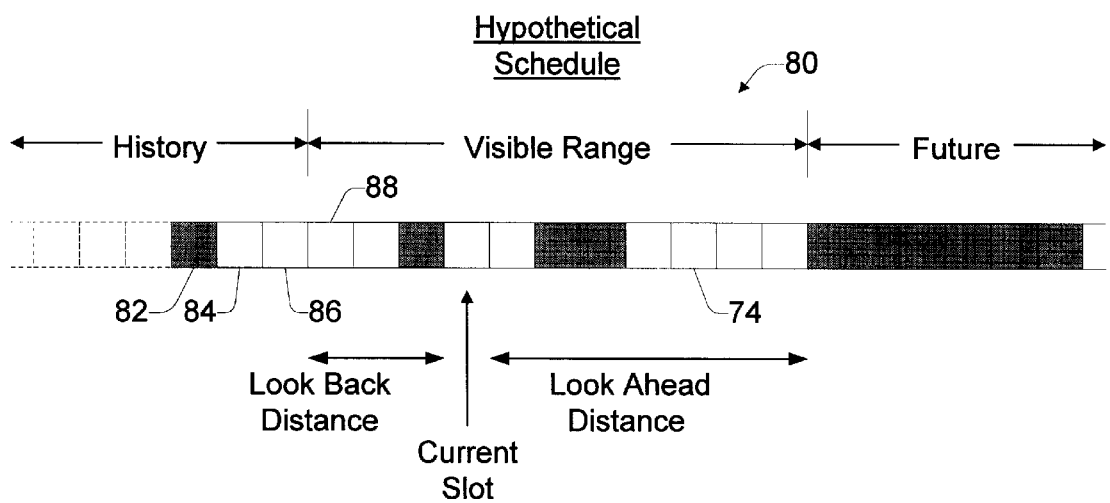
FIG. 7 shows a hypothetical version of the FIG. 6 schedule after the data server makes assumptions concerning occupancy and vacancy of slots outside of the visible range of the schedule.

FIG. 7 shows a hypothetical schedule 80 that represents the actual schedule 70 of FIG. 6 plus some assumptions as to whether historical and future slots are occupied. The data server assumes that all slots in the future are occupied, as represented by the filled blocks in the future range of the schedule.

For the historical portion of the hypothetical schedule whose slot ownership has passed to the next data server, the assumption is that slot occupancy follows a distribution with a mean that matches the measured occupancy density of the currently visible portion of the schedule. The data server calculates an "occupancy density" of the visible range plus the first slot beyond the visible range in the future, which is assumed to be occupied. In this example, the occupancy density is four occupied slots (i.e., three occupied slots in the visible range plus one future slot that is assumed to be occupied) out of twelve total slots (i.e., eleven slots in the visible range plus one future slot), yielding a value of 1/3.

The data server inverts the occupancy density to produce a bound on the assumed position of the last occupied slot before the visible range. In this example, inverting the occupancy density of 1/3 gives a bound of three. This value is referred to as the "historical bound" for the historical range in the hypothetical schedule 80. The historical bound is summarized by the following formula:

$$\text{Historical Bound} = (\text{Visible Range} + 1) \div (\text{Occupancy Count} + 1)$$

$$= (11 + 1) \div (3 + 1) = 3$$

The sum "visible range+1" is the size of the visible region plus the first slot from the future. The "visible range" can further be characterized as the sum of the look ahead distance (i.e., the number of slots in front of the current slot) plus the look back distance (i.e., the number of slots behind the current slot) plus one (i.e., the current slot). The sum "occupancy count+1" is the count of the occupied cells in the visible region plus the assumed occupancy of the first slot from the future.

Notice that the last recorded occupied slot in the actual schedule of FIG. 6 is five slots removed from the visible range and thus beyond the historical bound of three slots. Accordingly, the data server assumes that the calculated bound designates the last occupied slot, which is represented as number 82 in FIG. 7. If the last recorded occupied slot in the actual schedule had been nearer to the visible range than the calculated bound, the data server would have used the actual occupied slot.

Also note that the data server does not need to record an entire vector of the history region, although it can do so. Instead, the data server can keep only a scalar value that indicates the number of vacant slots immediately preceding the first slot in the visible range. This value is referred to as "past vacancies." In the example of FIG. 7, the past vacancies is two, because there are two unoccupied slots 84 and 86 in the history portion of the schedule immediately preceding the first slot 88 in the visible range.

Figure 8:
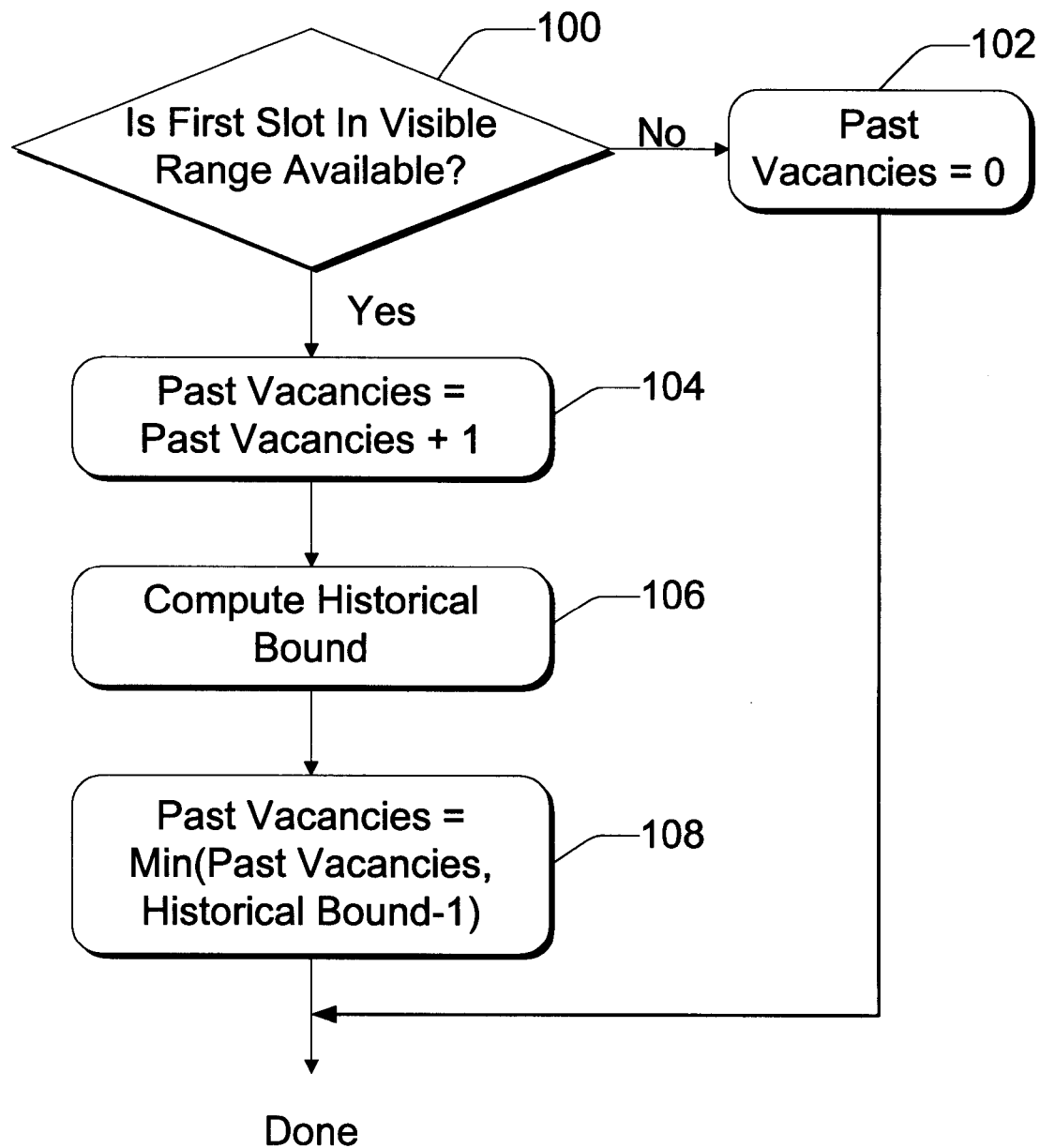
FIG. 8 is a flow diagram showing steps in a method for tracking the number of vacant slots that have recently passed out of the visible range of the data server as seen by the data server.

FIG. 8 shows steps in a method for continuously updating the "past vacancies" value each time the schedule advances one slot. At step 100, the data server checks whether the first visible slot is available. If the first visible slot is occupied (i.e., the "no" branch from step 100), this occupied slot will advance into the final slot of the history portion of the schedule after the schedule advances by one slot. Thus, the "past vacancies" count is set to zero (step 102 in FIG. 8).

On the other hand, if the first visible slot is available (i.e., the "yes" branch from step 100), the past vacancies count is increased by one (step 104 in FIG. 8). At step 106, the data server computes the historical bound using the equation described above. The data server then equates past vacancies to either the current past vacancies count or to one less than the historical bound, which ever is smaller (step 108 in FIG. 8).

Phase 2: Evaluate Insertion of New Stream In Current or Later Slots

In phase two, the data server determines whether it is better, according to the thrifty distributed scheduling policy, to insert a request for a new data stream into the current slot or wait for a subsequent slot in the schedule. The thrifty policy defines two measurable values of insertion at a target schedule location: the "insertion spread" and the "insertion width". The insertion spread is the number of vacant slots between the target slot and the nearest occupied slot. In contrast, the insertion width is the size of the cluster of occupied slots that would be created by an insertion into the target slot.

Figure 3:
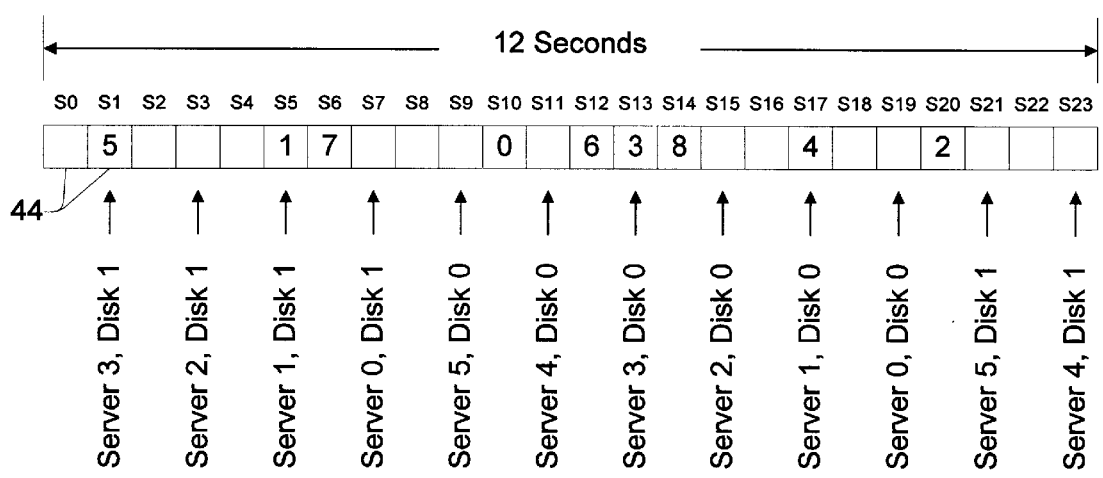
FIG. 3 shows a schedule used to coordinate data output among the various servers.
Figure 9:
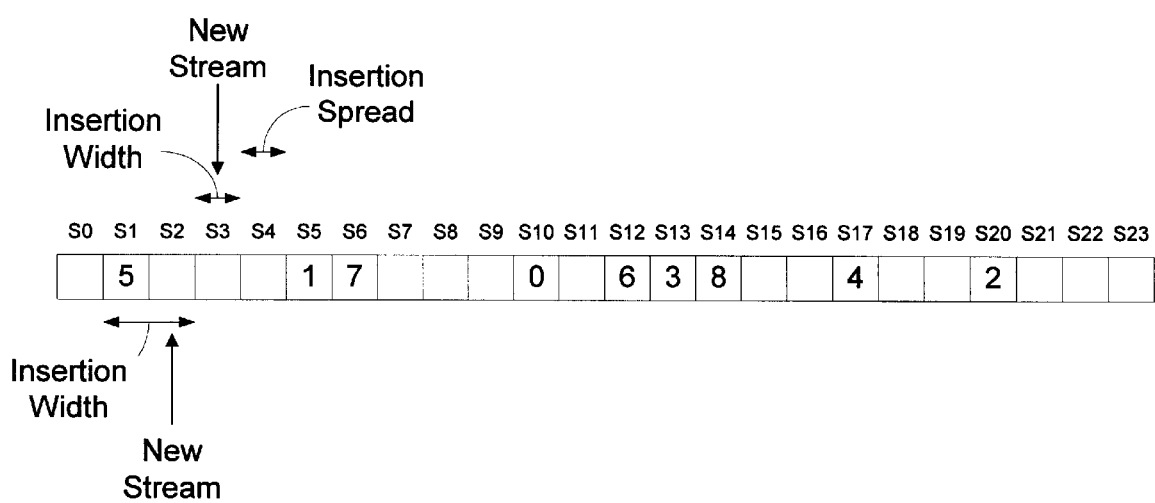
FIG. 9 is a reproduction of the FIG. 3 schedule and is used to demonstrate concepts of insertion spread and insertion width in the thrifty scheduling policy employed in the file server system.

FIG. 9 shows the same schedule as depicted in FIG. 3 and is provided here to demonstrate visually the concepts of insertion spread and insertion width for insertion of a new data stream request into a given slot in the schedule. The numbered slots are occupied with existing data streams. If a new stream is to be inserted into slot S3, for example, the "insertion spread" is one because there is only one vacant slot between slot S3 and the nearest occupied slot (i.e., either slot S1 or slot S5). The "insertion width" is also one because it would form only a cluster of one occupied slot as the two neighboring slots S2 and S4 remain unoccupied.

Now, suppose the new stream is to be inserted into slot S2. The "insertion spread" is zero because there is no vacant slot between slot S2 and its nearest occupied slot S1. The "insertion width" is two because the insertion would form a cluster of two occupied slots S1 and S2. Similarly, the "insertion width" for insertion into slot S4 or slot S7 is three, and the insertion width for insertion into slot S11 is five.

The insertion spread and insertion width are interrelated. Notice that the insertion width is greater than one if and only if the insertion spread equals zero. A goal of the thrifty distributed scheduling policy goals is to maximize insertion spread and to minimize insertion width. This goal results in a more even distribution of streams across the entire schedule.

Figure 10:
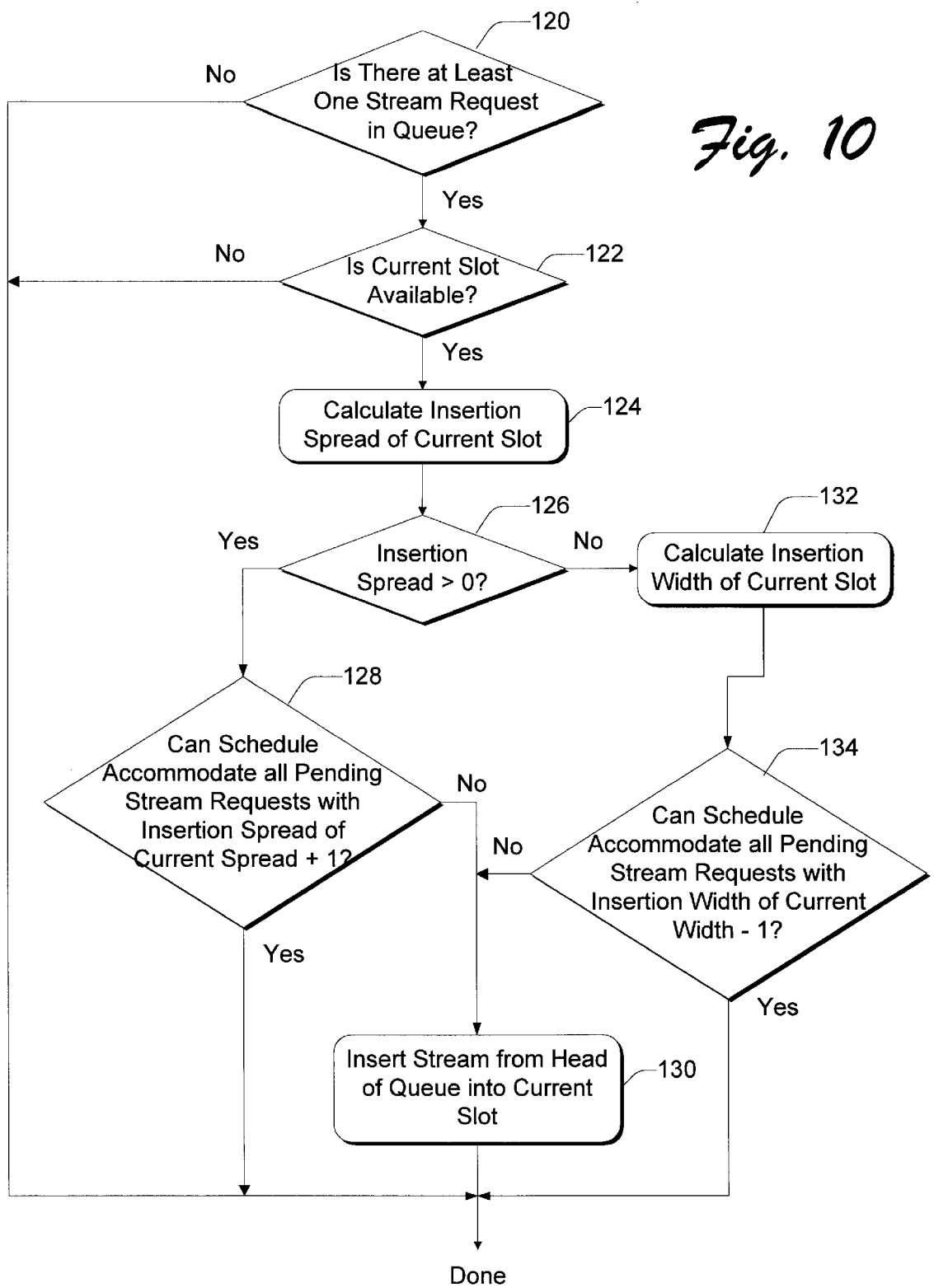
FIG. 10 is a flow diagram showing steps in a method for determining whether to insert a new data stream into the current slot of the schedule depending upon the values insertion spread and insertion width.

FIG. 10 shows general steps in a method for determining whether to insert a new data stream into the current slot or wait for a subsequent slot depending in part upon the insertion spread and insertion width. The steps are implemented in software as part of the schedulers 62 at the data servers. The details of certain steps within the FIG. 10 process are described in more detail with reference to FIGS. 11–16.

When the ownership period for a slot begins, the data server initially checks whether there is at least one new data stream request in the queue (step 120 in FIG. 10). If the queue is empty (i.e., the "no" branch from step 120), the process is finished for the current slot and then restarted at the next slot. If the queue is not empty (i.e., the "yes" branch from step 120), the data server determines whether the current slot is available (step 122 in FIG. 10). If occupied (i.e., the "no" branch from step 122), a new stream cannot be inserted into the current slot and hence the process completes.

Assuming the current slot is available and a request is pending, the scheduler computes the insertion spread of the currently owned slot (step 124 in FIG. 10). This involves counting the number of contiguous available slots preceding the current slot and, if the earliest such slot is the first visible slot, adding the past vacancies to this number. The scheduler then counts the number of contiguous available slots following the current slot and takes the minimum of the two results as the insertion spread that would result from an insertion into the current slot. This step is described below in more detail with reference to FIG. 11.

Next, the scheduler examines whether the calculated spread is greater than zero (step 126 in FIG. 10). If the spread is greater than zero (i.e., the "yes" branch from step 126), the scheduler evaluates whether all new data streams from the request queue can be placed in the schedule with a spread of one more than the current insertion spread, without exceeding an acceptable startup delay for any stream (step 128 in FIG. 10). That is, the scheduler looks to see if there is a better slot in the future into which the pending request should be inserted to better comply with the thrifty scheduling policy. This step is described below in more detail with reference to FIG. 13.

If all queued requests can be satisfied with a larger insertion spread (i.e., the "yes" branch from step 128), the current slot is left vacant because a subsequent slot is more desirable according to the thrifty scheduling policy. Insertion into the subsequent slot would result in a larger gap between occupied slots than if the stream were inserted now into the current slot. If a better slot cannot be located (i.e., the "no" branch from step 128), the scheduler inserts the new data stream from the head of the queue into the current slot (step 130 in FIG. 10). The process then completes for the current slot.

With reference again to step 126, if the insertion spread equals zero (i.e., the "no" branch from step 126), the scheduler computes an insertion width of the currently owned slot (step 132 in FIG. 10). This steps involves counting the number of contiguous occupied slots preceding and following the current slot, and sums these two numbers plus one as the width that would result from an insertion into the current slot. This step is described below in more detail with reference to FIG. 12.

The scheduler then attempts to place all new data streams into the schedule with a width of one less than the current insertion width, without exceeding any stream's acceptable delay (step 134 in FIG. 10). Once again, the scheduler is looking for a better slot in the future into which the pending request should be inserted to better comply with the thrifty scheduling policy. This step is described below in more detail with reference to FIG. 15.

If all queued requests can be satisfied with a smaller insertion width (i.e., the "yes" branch from step 134), the current slot is left vacant because there is a better slot in the future that would result in a smaller cluster of occupied slots. If a better slot cannot be located (i.e., the "no" branch from step 134), the scheduler inserts the new data stream from the head of the queue into the current slot (step 130). The process then completes for the current slot.

Step 124: Calculate Insertion Spread

Figure 11:
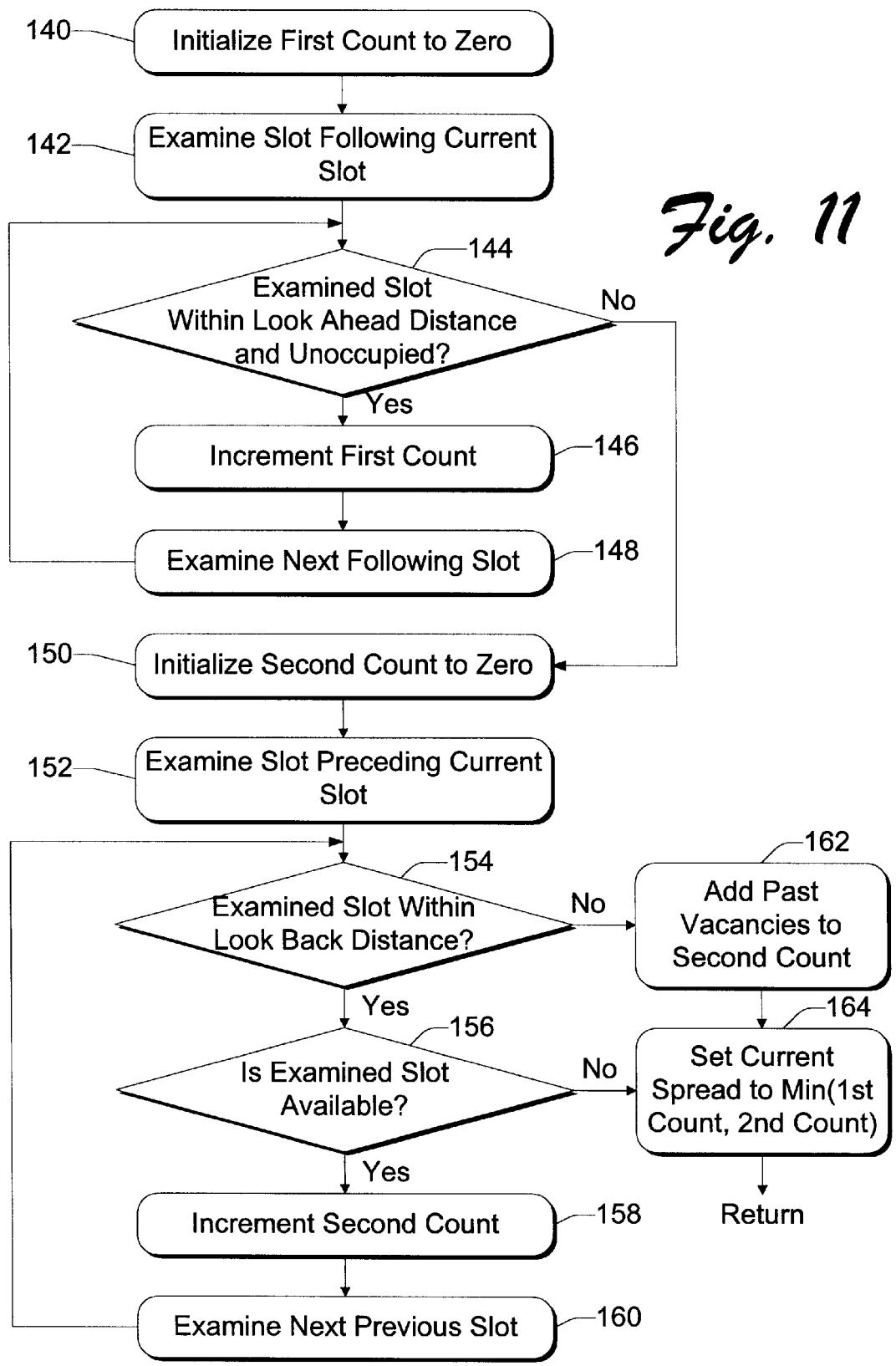
FIG. 11 is a flow diagram showing steps in a method for calculating the insertion spread for the current slot.

FIG. 11 shows a method for calculating the insertion spread for the current slot, labeled as step 124 in FIG. 10, in more detail. The steps in FIG. 11 are performed in software by the scheduler program operating at each of the data servers.

Generally, this process calculates the number of vacant slots on each side of the current slot in the event that the new stream is inserted into the current slot. At step 140, a first count indicative of the contiguously available slots following the current slot is initialized to zero. Then, the scheduler examines the next slot following the current slot (step 142 in FIG. 11) to determine if it is within the look ahead distance and available to receive a new data stream (step 144 in FIG. 11). If it is (i.e., the "yes" branch from step 144), the first count is incremented by one (step 146) and the scheduler advances to examine the next slot (step 148).

When the scheduler encounters a slot that is either not within the look ahead distance or is occupied (i.e., the "no" branch from step 144), the scheduler initializes to zero a second count indicative of the contiguous available slots preceding the current slot (step 150 in FIG. 11). The scheduler examines the slot preceding the current slot (step 152) to determine if it is within the look back distance (step 154 in FIG. 11). If it is (i.e., the "yes" branch from step 154), the scheduler determines whether the slot is available to receive a new data stream (step 156). If the slot is available (i.e., the "yes" branch from step 156), the second count is incremented by one (step 158) and the scheduler advances to examine the next previous slot (step 160).

With reference again to step 154, if the preceding slot is not within the look back distance (i.e., the "no" branch from step 154), the scheduler adds the past vacancies to the second count (step 162). The scheduler then sets the current insertion spread to the minimum of the first count or the second count (step 164 in FIG. 11). That is, Insertion Spread=Min (first count, second count)

To illustrate steps 162 and 164, consider the schedule of FIG. 7, with the pointer to the current slot. The first count of following available slots is one. The second count of preceding available slots is zero. Because the algorithm found an occupied slot without looking back its fill possible distance, it exited via step 156 (and not 154) and so did not add past vacancies to the second count. Hence, the insertion spread is zero (i.e., the minimum of one and zero).

It is noted that step 164 can be arrived at when the examined slot is unavailable (i.e., the "no" branch from step 156).

Step 132: Calculate Insertion Width

Figure 12:
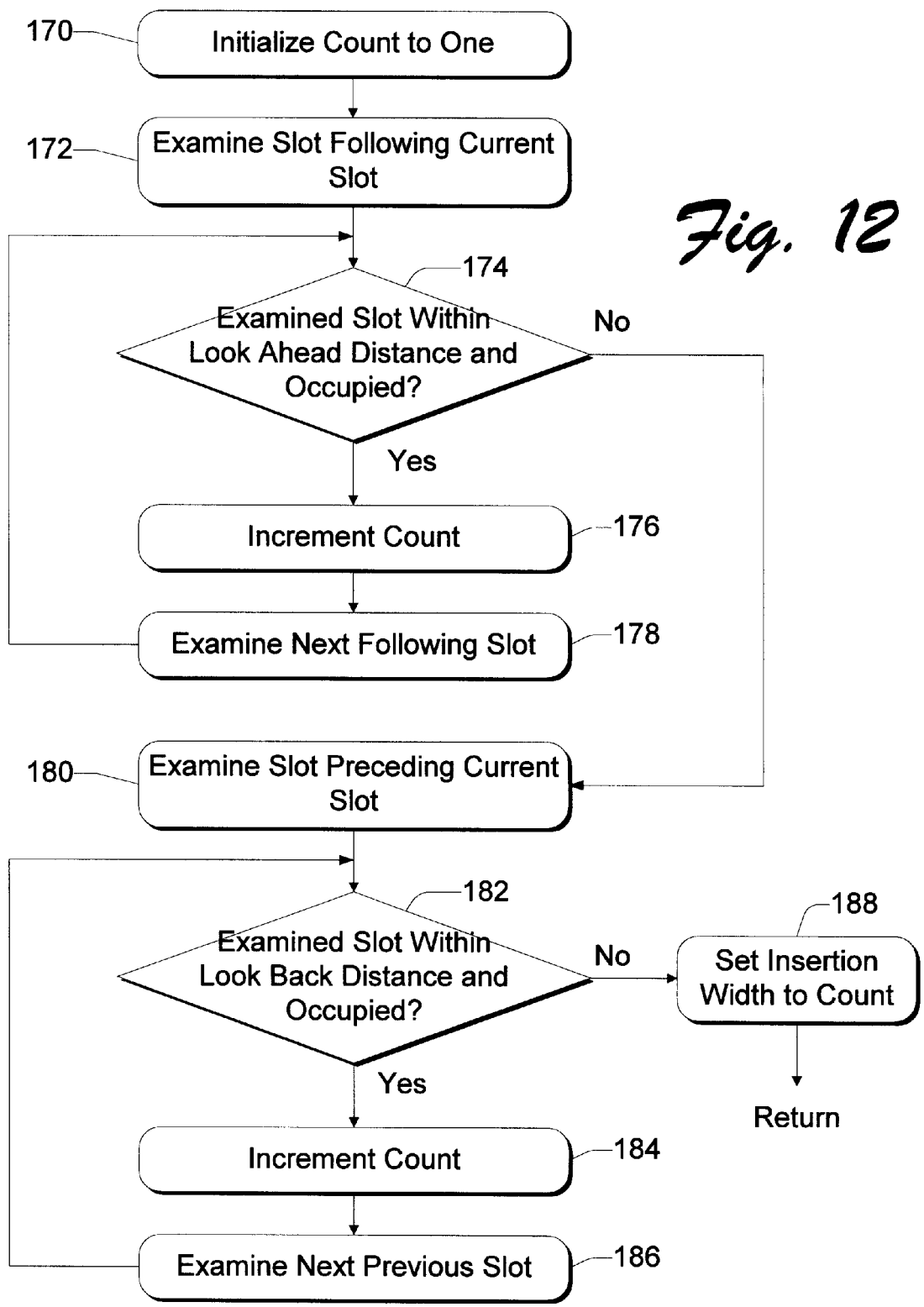
FIG. 12 is a flow diagram showing steps in a method for calculating the insertion width for the current slot.

FIG. 12 shows a method for calculating the insertion width for the current slot, labeled as step 132 in FIG. 10, in more detail. The steps are performed in software by the scheduler program operating at each of the data servers.

Generally, this process calculates the number of clustered occupied slots in the event that the new stream is inserted into the current slot. At step 170, a count indicative of the contiguous available slots both preceding and following the current slot is initialized to one. This initial value of one accounts for the current slot in the event the stream is inserted therein. The scheduler examines the next slot following the current slot (step 172 in FIG. 12) to determine if it is within the look ahead distance and occupied (step 174 in FIG. 12). If it is (i.e., the "yes" branch from step 174), the count is incremented by one (step 176) and the scheduler advances to examine the next slot (step 178).

When the scheduler encounters a slot that is either not within the look ahead distance or is available (i.e., the "no" branch from step 174), the scheduler examines the slot preceding the current slot (step 180) to determine if it is within the look back distance and occupied (step 182 in FIG. 12). If it is (i.e., the "yes" branch from step 182), the count is incremented by one (step 184) and the scheduler advances to examine the next previous slot (step 186).

When the scheduler encounters a previous slot that is either not within the look back distance or is available (i.e., the "no" branch from step 154), the scheduler sets the current insertion width to the count (step 188 in FIG. 12). That is, Insertion Width=Count To illustrate this computation, consider the schedule of FIG. 7 with the pointer to the current slot. There are no following occupied slots and only one previous occupied slot, yielding a total count of two. Hence, the insertion width is two.

Step 128: Accommodate Streams Given Insertion Spread

After the insertion spread and insertion width are computed, the scheduler determines whether all queued requests can be satisfied with a larger insertion spread or a smaller insertion width. If they can, the current slot is left vacant because there are better slots in the future for receiving the data stream according to the thrifty policy. If no better slots are found, the stream from the head of the queue is inserted into the current slot.

Figure 13:
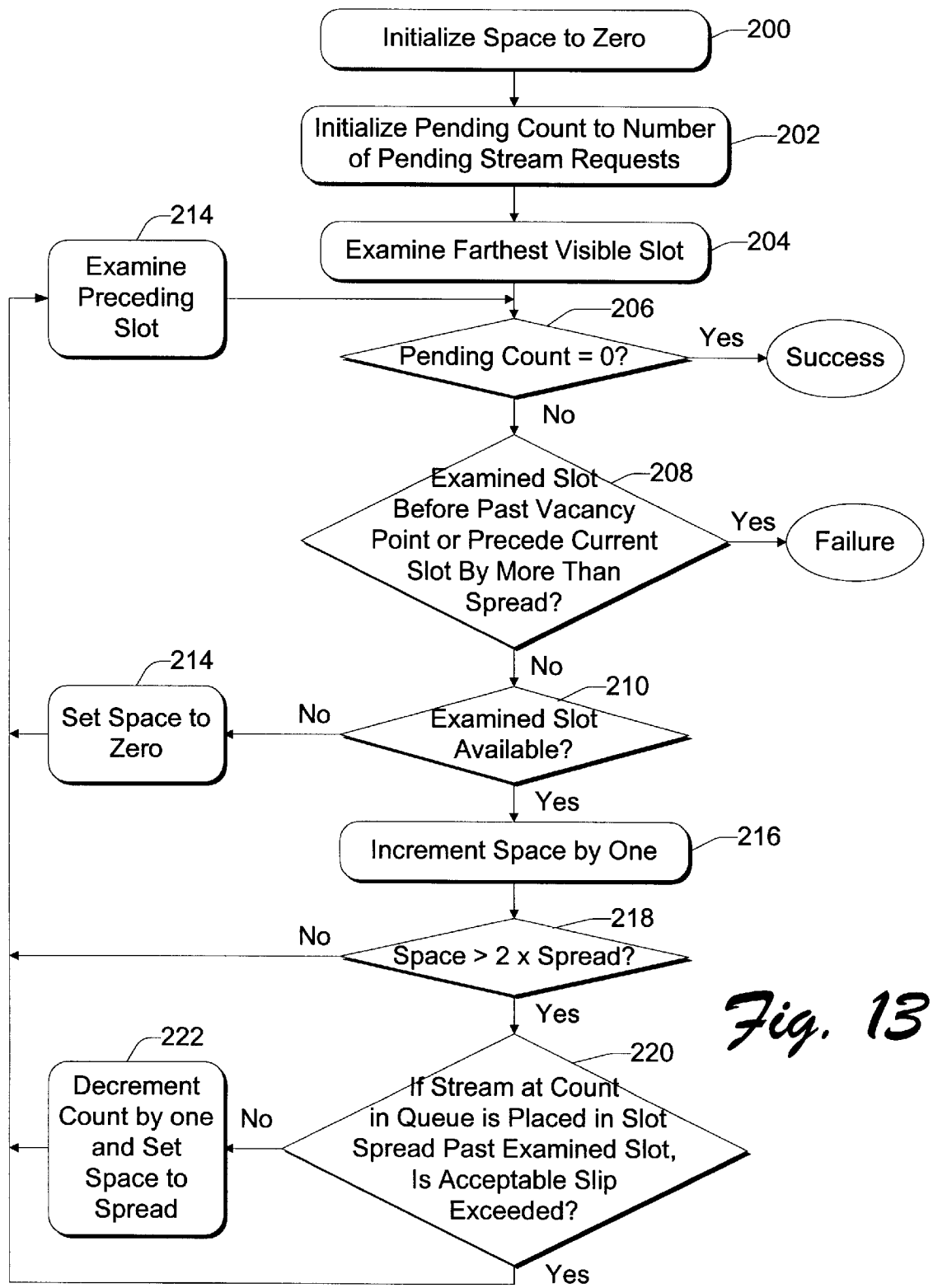
FIG. 13 is a flow diagram showing steps in a method for determining whether the schedule can accommodate all pending stream requests with a given insertion spread.

FIG. 13 shows a method for determining whether the schedule can accommodate all pending stream requests with a given insertion spread, labeled as step 128 in FIG. 10. The steps are performed in software by the scheduler program operating at each of the data servers. The steps will be described with additional reference to an exemplary schedule 190 shown in FIG. 14. For discussion purposes, the schedule 190 has an acceptable slip value of ten slots and a target spread of two slots. The past vacancy point is at slot S2, which is the earliest vacant slot according to the calculation of past vacancies described above. The current slot is slot S9.

The insertion spread of one slot is calculated for the schedule 190 according to step 124 in FIG. 10, which is the method described above with respect to FIG. 11. Inserting the data stream into the current slot S9 would produce an insertion spread of one slot since there is only one vacant slot between the current slot S9 and the nearest occupied slot S7. Because the scheduler would like to do better than a one-slot spread, step 128 will use a value of two for its insertion width.

Furthermore, assume that there are two requests pending in the queue: Request A and Request B. Request A is at the head of the queue and has already been slipped six slots. Request B is the next request in the queue and has slipped two slots.

At step 200, the scheduler initializes a space variable to zero. The space variable will be used to count the number of contiguous available slots. The scheduler also initializes a pending count variable to two because there are two pending stream requests in the queue (step 202 in FIG. 13). The scheduler then examines the farthest visible slot, which is assumed to be slot S22 for this example (step 204). The process loops through each previous slot (i.e., right to left in the schedule of FIG. 14) until either (1) the pending count has been decremented to zero (indicating that a location has been found for all pending stream requests in the queue), which is handled by step 206, or (2) all possible locations in the schedule have been examined, which is represented by step 208.

At step 210 in FIG. 13, the scheduler examines the occupancy of each preceding slot beginning at slot S22. If the examined slot is occupied (i.e., the "no" branch from step 210), the space variable is reset to zero (step 212) and the scheduler proceeds to the next preceding slot (step 214). If the slot is available (i.e., the "yes" branch from step 210), the space variable is incremented by one (step 216). It is noted that all slots between the past vacancy point and the end of the history region are regarded as available.

At step 218 in FIG. 13, the scheduler checks whether the space variable is greater than twice the given insertion spread. As long as the space variable is twice the insertion spread or less (i.e., the "no" branch from step 218), the process continues to the next preceding slot (step 214).

Figure 14:
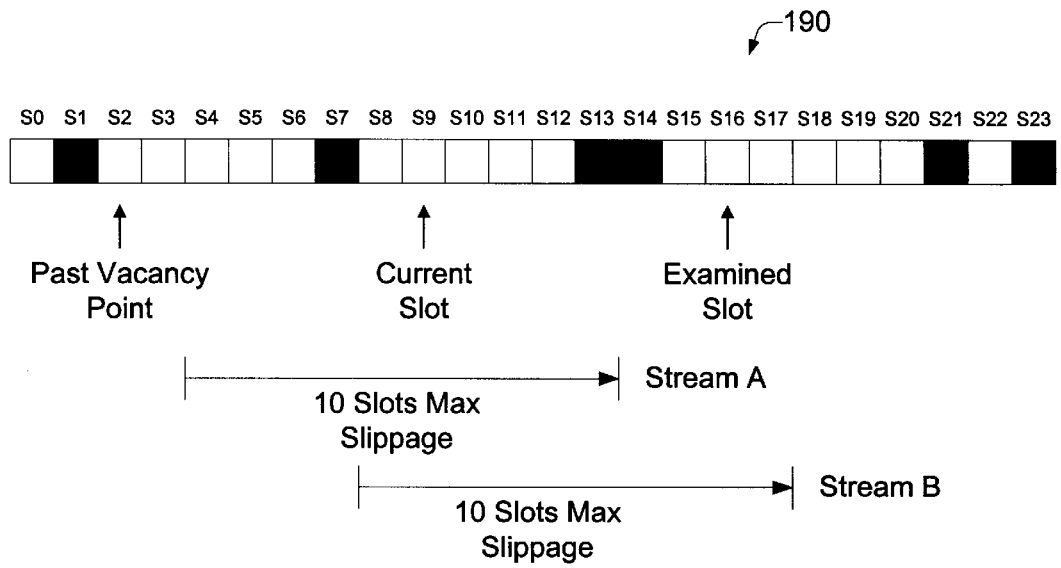
FIG. 14 is an exemplary schedule used to illustrate the process of FIG. 13.

In the schedule 190 of FIG. 14, the process loops until it reaches slot S16, which is the point where the space variable exceeds two times the insertion spread. Since slot S16 is unoccupied, the space variable is incremented to five, which indicates that a series of five unoccupied slots begins with slot S116. Five is greater than twice the spread of two. Slot S116 is referenced in the drawing by the caption "examined slot" to indicate that the scheduler is currently examining slot S16, at which point the test of step 218 is passed.

Whenever the test of step 218 passes (i.e., the "yes" branch from step 218), the scheduler evaluates whether the stream whose depth in the queue equals the pending count (that is, the most recent request for which a location has not yet been found) can be placed in the slot Spread past the examined slot by the given spread without slipping the stream beyond the acceptable slip value (step 220 in FIG. 13). If insertion into that slot exceeds the slip value (i.e., the "yes" branch from step 220), the process continues to the next examined slot (step 214). Otherwise (i.e., the "no" branch from step 220), the scheduler decrements the pending count by one and sets the space variable to the spread (step 222).

In the first time through the process of FIG. 13, the scheduler initially considers Request B since the pending count is two. Assuming the currently examined slot is slot S16 in FIG. 14, step 220 evaluates whether Request B with a slip of two at current slot S9 can be placed into slot S18, which is the two slot spread ahead of the examined slot S16, without exceeding a slip value of ten slots. In this case, the resulting slip is eleven (i.e., slot 18 –current slot 9+2 slots slippage), which exceeds the acceptable slip value of ten. Therefore, stream B cannot be placed in the slot S18 without exceeding the slip value and the process continues to the next preceding slot (step 214).

At the next preceding slot S15, the space variable is incremented to a value of six (step 216), indicating that a series of six unoccupied slots begins with this slot. Since six is greater than twice the given spread of two, the step 218 test passes. The scheduler then evaluates whether stream B with slip two at current slot S9 can be placed in slot S17, which is two slots ahead of the examined slot S15, without exceeding the acceptable slip of ten slots. In this case, the resulting slip is ten (i.e., slot 17 –current slot 9+2 slots slippage), which is within the acceptable slip value often.

Thus, decision step 220 returns negative and the pending count is decremented by one to indicate that a place has been found for stream B. In addition, the space variable is set equal to the given spread of two, indicating that a series of two unoccupied slots begins with this slot S15. The two unoccupied slots are slots S15 and S16, since slot S17 is now assumed to contain a stream, even though stream B has not yet been assigned to that slot since the scheduler does not yet have ownership of that slot.

The scheduler continues through the rest of the schedule. When the scheduler reaches slot S8, the space variable has a value of five. Since this is greater than twice the given spread of two, the scheduler again evaluates whether stream A with a slip of six at slot S9 can be placed in slot S10, which is two slots ahead of examined slot S8, without exceeding the acceptable slip of ten slots. In this case, the resulting slip for stream A is seven slots (i.e., slot 10 –current slot 9+6 slots slippage), which is within the acceptable value of ten.

Accordingly, decision step 220 returns negative and the pending count is decremented by one to indicate that a place has been found for stream A. When the loop continues, the pending count will be found to equal zero, allowing the process to terminate successfully.

Since the process returns successfully, the process returns affirmative to decision step 128 in FIG. 10 and the scheduler will not insert the stream into the current slot because better slots can be found for all pending streams later in the schedule. Accordingly, the scheduler will proceed to the next slot in the schedule and repeat the steps of FIG. 10. Had the tests failed, the process returns negative to decision step 128 in FIG. 10 and the scheduler would have inserted the stream in the current slot at step 130.

Step 134: Accommodate Streams Given Insertion Width

Figure 15:
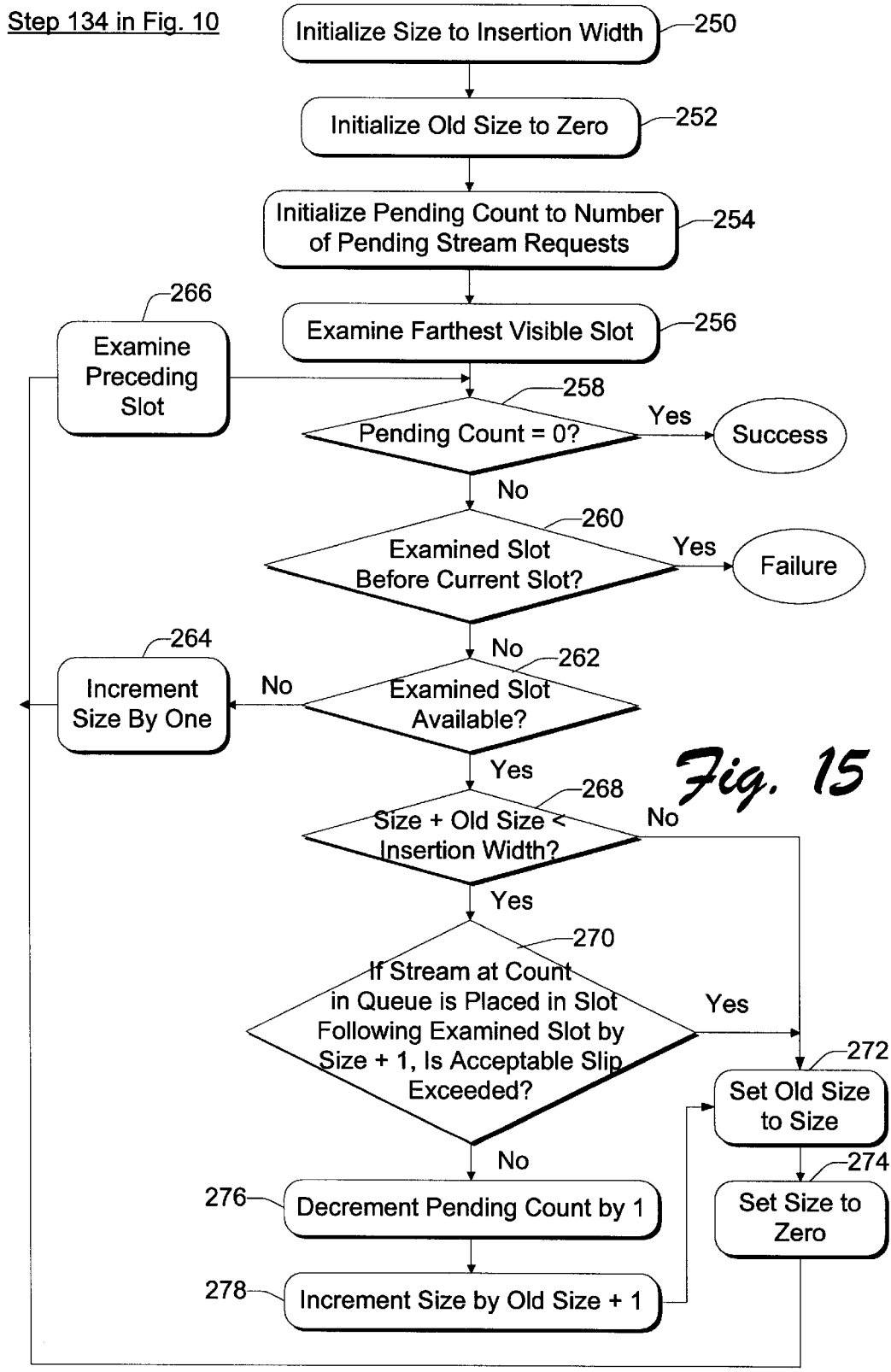
FIG. 15 is a flow diagram showing steps in a method for determining whether the schedule can accommodate all pending stream requests with a given insertion width.

FIG. 15 shows a method for determining whether the schedule can accommodate all pending stream requests with a given insertion width, labeled as step 134 in FIG. 10. The steps are performed in software by the scheduler program operating at each of the data servers. The steps will be described with additional reference to an exemplary schedule 240 shown in FIG. 16. For discussion purposes, the schedule 240 has an acceptable slip value of ten slots and a target width of four slots. The current slot is slot S5.

The insertion width of five slots is calculated for the schedule 240 according to step 132 in FIG. 10, which is the method described above with respect to FIG. 12. Inserting the data stream into the current slot S5 would create a cluster of five consecutive occupied slots from slots S1 to S5. Because the scheduler would like to do better than five consecutive slots, step 134 will use a value of four for its insertion width.

Furthermore, assume that there are two requests pending in the queue: Request A and Request B. Request A is at the head of the queue and has already been slipped three slots. Request B is the next request in the queue, but has not yet slipped any slots (i.e., zero slots).

At step 250 in FIG. 15, the scheduler initializes a size variable to the given insertion width of four. The size variable indicates the number of contiguous occupied slots immediately following the examined slot. The scheduler also initializes an old size variable to zero (step 252) and a pending count variable to two because there are two pending stream requests in the queue (step 254). The old size variable indicates the number of occupied slots following the first group of occupied slots and separated by one unoccupied slot.

The scheduler examines the farthest visible slot, which is assumed to be slot S22 for this example (step 256). The process then loops through each previous slot (i.e., right to left in the schedule 240 of FIG. 16) until either (1) the pending count has been decremented to zero (indicating that a location has been found for all pending stream requests in the queue), which is handled by step 258, or (2) all possible locations in the schedule have been examined, which is represented by step 260.

At step 262 in FIG. 13, the scheduler examines the occupancy of each preceding slot beginning from slot S22. If the examined slot is occupied (i.e., the "no" branch from step 262), the size variable is incremented by one (step 264) and the scheduler proceeds to the next preceding slot (step 266). If the examined slot is available (i.e., the "yes" branch from step 262), the scheduler performs a test to determine whether a satisfactory location is available for a stream in its queue.

The test comprises two steps. First, at step 268 in FIG. 15, the scheduler evaluates whether the sum of the size variable and the old size variable is less than the given insertion width. Second, at step 270 in FIG. 15, the scheduler determines whether the stream whose depth in the queue equals the pending count (that is, the most recent request for which a location has not yet been found) can be placed in the slot following the examined slot by the size value plus one without slipping the stream beyond the acceptable slip value.

If either test fails (i.e., the "no" branch from step 268 or the "yes" branch from step 270), the scheduler sets the old size equal to the size variable and sets the size variable to zero (steps 272 and 274 in FIG. 15). If both tests are successful (i.e., the "no" branch from step 270), the scheduler decrements the pending count by one (step 276) to indicate that a slot for the request in the queue has been located.

The scheduler then increments the size variable by the old size plus one is (step 278). The sum of the size variable plus the old size variable plus one indicates the width of a cluster of occupied slots that will be formed if a stream is inserted between the two groups of clusters indicated by size and old size, respectively. The scheduler then copies the size variable to the old size variable (step 272) and zeroes the size variable (step 274) before continuing to the next preceding slot (step 266).

Figure 16:
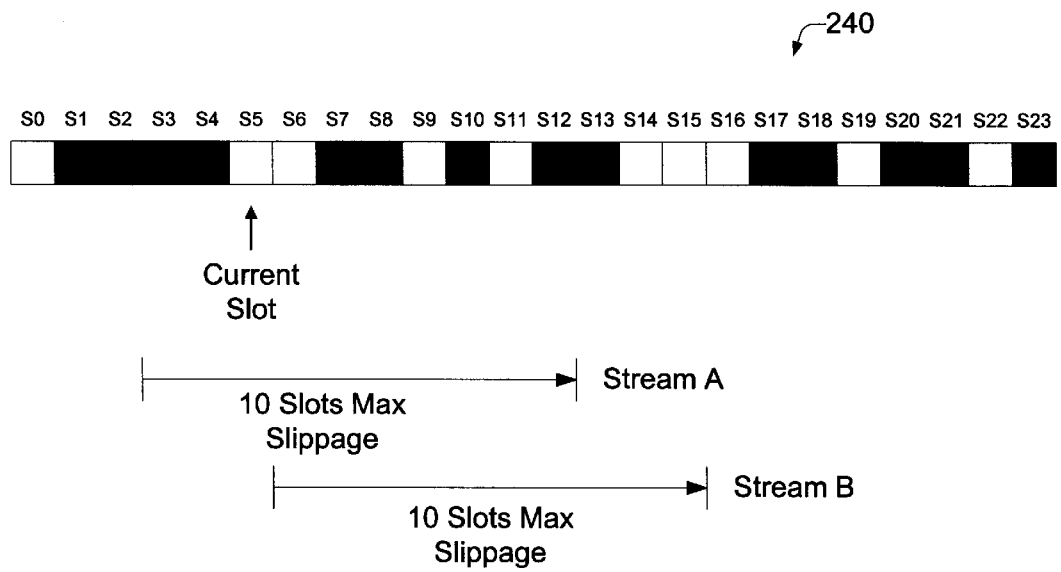
FIG. 16 is an exemplary schedule used to illustrate the process of FIG. 15.

With reference to the exemplary schedule 240 in FIG. 16, the scheduler tracks the size variable and the old size variable when examining each slot beginning with slot S22. Initially, the size variable is set to four and the old size variable is set to zero (steps 250 and 252). A more correct value for the size variable is actually infinity, since the process assumes that an infinite number of slots are occupied beyond the visible range. But, it is only necessary to set size variable to the given insertion width for the process to operate correctly.

When slot S22 is examined and found to be unoccupied, the first test at step 268 fails because the size variable plus the old size variable (i.e., 4+0) is not less than the given insertion width of four. The old size is set to the value of the size variable (i.e., 4) and the size variable is set to zero (steps 272 and 274). When slot S21 is examined and found to be occupied, the size variable is incremented to one (steps 262 and 264). When slot S20 is found to be occupied, the size variable is incremented to two (steps 262 and 264), and so on.

When the scheduler reaches slot S16, the size variable is two because slots S17 and S18 are occupied and the old size is two for the previous contiguous occupied slots S20 and S21, which are separated from slots S17 and S18 by one unoccupied slot S19. At slot S15, the variable size is back to zero because the following slot is available. The old size variable is set to two because the contiguous occupied slots S17 and S18 are set apart only by one unoccupied space S16.

When slot S15 is found to be vacant, the first test at step 268 passes because the size variable plus the old size variable (i.e., 0+2) is less than the given insertion width of four. The scheduler then proceeds to the test at step 270 to evaluate whether stream B with a slip of zero at the current slot S5 can be placed into slot S16, without exceeding a slip of ten slots. Slot S16 is chosen because it is the slot following the examined slot S15, which is derived by adding one to the size variable of zero. In this case, the resulting slip for stream B is eleven slots (i.e., slot 16 −current slot 5+0 slots slippage), which exceeds the acceptable value of ten. Therefore, stream B cannot be placed in slot S15. The old size variable is set to the size variable of zero (step 272) and the size variable is set to zero (step 274).

When the next slot S14 is found to be unoccupied, the first test at step 268 passes because the size variable plus the old size variable (i.e., 0+0) is less than the given insertion width of four. The scheduler then proceeds to the test at step 270 to evaluate whether stream B with a slip of zero at the current slot S5 can be placed into slot S15, without exceeding a slip of ten slots. Slot S15 is chosen because it is the slot following the examined slot S14, which is derived by adding one to the size variable of zero. In this case, the resulting slip for stream B is ten slots (i.e., slot 15 −current slot 5+0 slots slippage), which is within the acceptable value of ten. Therefore, stream B can be placed in slot S15.

The pending count is decremented by one to indicate that a place has been found for stream request B (step 276). In addition, the size variable is incremented by the old size (i.e., 0 in this case) plus one, which in the example indicates that a series of one occupied slot begins with this slot. The size variable is then copied to the old size variable (step 272), and the size variable is zeroed (step 274).

The scheduler then continues through the process to evaluate whether a slot can be located for request A at the head of the queue. When the scheduler reaches slot S6, the size variable has a value of two because slots S7 and S8 are occupied. The old size variable has a value of one because the previous contiguous occupied slot S10 is separated from slots S7 and S8 by one unoccupied slot S9 Slot S6 is unoccupied (step 262) and the sum of the size variable plus the old size variable (i.e., 0+2) is less than the given width of four (step 268).

The scheduler then checks whether stream A with slip three at current slot S5 can be placed in slot S9 without exceeding a slip of 10 slots. Slot S9 is selected because it is three slots following the examined slot S6, which is derived by adding one to the size variable of two. In this case, the resulting slip for stream A is seven slots (i.e., slot 9 −current slot 5+3 slots slippage), which is within the acceptable value of ten. Therefore, stream A can be placed in slot S9.

The pending count is decremented by one to indicate that a place has been found for stream request A (step 276).

When the scheduler returns to step 258, the pending count will be found equal to zero, so the scheduler terminates the process successfully.

Since the process returns successfully, decision step 134 in FIG. 10 is affirmative and the scheduler will not insert the stream into the current slot because better slots can be found for all pending streams later in the schedule. Accordingly, the scheduler will proceed to the next slot in the schedule and repeat the steps of FIG. 10.

The aspects of this invention described above are primarily directed for implementation in the distributed file server system. However, there are aspects of this invention that can be implemented in either the distributed or centralized file server system. In particular, either system may employ the thrifty policy algorithms described above to determine whether multiple pending requests in a queue can be serviced all at once.

According to these aspects, the scheduler (either local or centralized) has a queue to temporarily hold multiple requests to insert new data streams into the schedule. The scheduler examines the schedule to determine whether all of the queued requests can be inserted into the schedule under the thrifty policy of attempting to maximize distances between consecutively occupied slots and minimize contiguously occupied slots. The scheduler essentially employs the same processes described above with reference to FIGS. 10–16 to compute insertion spread and insertion width, and to determine whether the schedule can accommodate all pending streams given the insertion spread and insertion width, without exceeding the acceptable slip value.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. In a file server system having multiple data servers connected to distribute data streams over a network, each data server supporting at least one storage device, wherein data files are distributed across the data servers and stored on each of the storage devices, a method comprising the following steps:

distributing among the data servers a schedule for serving requested ones of the data streams so that individual data servers view different portions of the schedule, the schedule being segmented into slots to which data streams are assigned for coordinating service of the requested data streams, the individual data servers having ownership of a current slot within their respective portions of the schedule;

receiving at a particular data server a request to insert a new data stream into the current slot in the portion of the schedule currently being viewed by the particular data server; and evaluating at the particular data server whether to insert the new data stream into the current slot or to wait for a subsequent slot in the schedule based upon a distribution criteria indicating whether said insertion into the current slot, in comparison to said waiting for a subsequent slot, would result in a less even distribution of the scheduled data streams within the schedule.

2. A method as recited in claim 1, wherein the evaluating step includes the step of calculating an insertion spread indicating a number of contiguous vacant slots in the portion of the schedule currently being viewed by the particular data server.

3. A method as recited in claim 1, wherein the evaluating step includes step of calculating an insertion width indicating a number of contiguous occupied slots in the portion of the schedule currently being viewed by the particular data server.

4. A method as recited in claim 1, wherein the evaluating step comprises the following steps:

calculating an insertion spread indicating a number of contiguous vacant slots in the portion of the schedule currently being viewed by the particular data server;

calculating an insertion width indicating a number of contiguous occupied slots in the portion of the schedule currently being viewed by the particular data server; and choosing between inserting the new data stream into the current slot and waiting for a subsequent slot in a manner that maximizes the insertion spread and minimizes the insertion width.

5. A computer programmed to perform the steps recited in the method of claim 1.

6. A computer-readable medium having computer-executable instructions for performing the steps of the method as recited in claim 1.

7. In a distributed file server system having multiple data servers connected to distribute data streams over a network, each data server supporting at least one storage device, wherein data files are distributed across the data servers and stored on each of the storage devices, wherein a schedule for serving requested ones of the data streams is distributed among the data servers so that that individual data servers view different portions of the schedule, the schedule being segmented into slots to which data streams are assigned for coordinating service of the requested data streams, a method for operating one of the data servers comprising the following steps:

receiving a portion of the schedule;

making assumptions as to whether slots preceding the schedule portion and following the schedule portion are occupied; and determining whether a new data stream should be inserted into the schedule portion based upon a policy that attempts to maximize distances between consecutively occupied slots and minimize contiguously occupied slots.

8. A method as recited in claim 7, wherein the making step comprises the step of assuming all future slots following the schedule portion are occupied.

9. A method as recited in claim 7, wherein the making step comprises the step of assuming all past slots preceding the schedule portion have an occupancy density approximately equal to that of the schedule portion.

10. A method as recited in claim 9, further comprising the step of deriving a bound representing a maximum number of past slots preceding the schedule portion on which said assumptions will be made.

11. A method as recited in claim 7, further comprising the step of tracking a number of contiguously vacant slots preceding the schedule portion.

12. A method as recited in claim 7, wherein the determining step comprises the step of computing the distances between the consecutively occupied slots.

13. A method as recited in claim 7, wherein the determining step comprises the step of deriving a highest number of the contiguously occupied slots.

14. A computer programmed to perform the steps recited in the method of claim 7.

15. A computer-readable medium having computer-executable instructions for performing the steps of the method a s recited in claim 7.

16. A continuous media file server system comprising:
multiple data servers, each data server supporting at least one storage device, wherein data files are distributed across the data servers so that data blocks of the data files are stored on each of the storage devices;
multiple schedulers located at corresponding ones of the data servers, each scheduler facilitating service of requested data streams from its corresponding data server according to a portion of a schedule that is available to the scheduler, the schedule portion having slots which are assigned to the requested data streams; and
each scheduler being configured to make assumptions as to whether slots preceding the schedule portion and following the schedule portion are occupied as having been assigned to a requested data stream, each scheduler determining whether a new data stream can be inserted into the schedule portion based upon a policy that attempts to maximize distances between consecutively occupied slots and minimize contiguously occupied slots.

17. A continuous media file server system as recited in claim 16, wherein the scheduler is configured to assume all future slots following the schedule portion are occupied.

18. A continuous media file server system as recited in claim 16, wherein the scheduler is configured to assume all past slots preceding the schedule portion have an occupancy density approximately equal to that of the schedule portion.

19. A continuous media file server system as recited in claim 18, wherein the scheduler is configured to derive a bound representing a maximum number of past slots preceding the schedule portion on which said assumptions will be made.

20. A continuous media file server system as recited in claim 16, wherein the scheduler is configured to track a number of contiguously vacant slots preceding the schedule portion.

21. A continuous media file server system as recited in claim 16, wherein the scheduler is configured to compute the distances between the consecutively occupied slots.

22. A continuous media file server system as recited in claim 16, wherein the scheduler is configured to derive a highest number of the contiguously occupied slots.

23. A scheduler embodied as a computer program on a computer-readable medium, the scheduler being implemented in a distributed file server system having multiple data servers connected to distribute data streams over a network, each data server supporting at least one storage device, wherein data files are distributed across the data servers and stored on each of the storage devices, wherein a schedule for serving requested ones of the data streams is distributed among the data servers so that that individual data servers view different portions of the schedule, the schedule being segmented into slots to which data streams are assigned for coordinating service of the requested data streams, the scheduler comprising:
code means for receiving a portion of the schedule;
code means for making assumptions as to whether slots preceding the schedule portion and following the schedule portion are vacant or occupied; and
code means for determining whether a new data stream can be inserted into the schedule portion based upon a policy that attempts to maximize distances between consecutively occupied slots and minimize contiguously occupied slots.

* * * * *

UNITED STATES PATENT AND TRADEMARK OFFICE
CERTIFICATE OF CORRECTION

PATENT NO. : 6,401,126 B1
DATED : June 4, 2002
INVENTOR(S) : Douceur et al.

It is certified that error appears in the above-identified patent and that said Letters Patent is hereby corrected as shown below:

Title page,
Item [57], ABSTRACT,
Line 2, insert -- each of the data servers. A scheduler is located at each of the data servers to -- before "manage" and after "at".

Column 15,
Line 61, replace "fill" with -- full --.

Column 17,
Line 39, replace "S116." with -- S16. --.
Line 40, replace "S116" with -- S16 --.

Column 22,
Line 2, insert -- the -- between "includes" and "step".

Signed and Sealed this

Fifth Day of November, 2002

*Attest:*

*Attesting Officer*

JAMES E. ROGAN
*Director of the United States Patent and Trademark Office*